United States Patent
Kim et al.

(10) Patent No.: US 11,552,801 B2
(45) Date of Patent: Jan. 10, 2023

(54) METHOD OF OPERATING MEMORY SYSTEM WITH REPLAY ATTACK COUNTERMEASURE AND MEMORY SYSTEM PERFORMING THE SAME

(71) Applicant: SAMSUNG ELECTRONICS CO., LTD., Suwon-si (KR)

(72) Inventors: Sunghyun Kim, Suwon-si (KR); Junho Huh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 335 days.

(21) Appl. No.: 16/790,243

(22) Filed: Feb. 13, 2020

(65) Prior Publication Data
US 2020/0358620 A1   Nov. 12, 2020

(30) Foreign Application Priority Data

May 10, 2019 (KR) .................. 10-2019-0054677

(51) Int. Cl.
*H04L 9/32* (2006.01)
*G06F 3/06* (2006.01)
*G06F 21/55* (2013.01)

(52) U.S. Cl.
CPC ............ *H04L 9/3242* (2013.01); *G06F 3/062* (2013.01); *G06F 3/0659* (2013.01);
(Continued)

(58) Field of Classification Search
CPC ..... H04L 9/3242; H04L 9/3297; G06F 3/062; G06F 3/0659; G06F 3/0673; G06F 21/554; G06F 2221/034; G06F 21/78; G06F 2221/2151; G06F 15/7807; G06F 21/602; G06F 21/79; G06F 21/53; G06F 21/55; G06F 21/57
See application file for complete search history.

(56) References Cited

U.S. PATENT DOCUMENTS

| | | | | | |
|---|---|---|---|---|---|
| 4,040,034 | A | * | 8/1977 | Belady | G07C 1/00 714/E11.204 |
| 7,472,273 | B2 | * | 12/2008 | Haverinen | H04W 12/06 713/168 |

(Continued)

FOREIGN PATENT DOCUMENTS

| | | | | |
|---|---|---|---|---|
| CN | 101789864 A | * | 7/2010 | |
| CN | 1941692 B | * | 10/2010 | ........... H04L 9/3263 |

(Continued)

*Primary Examiner* — Shahriar Zarrineh
(74) *Attorney, Agent, or Firm* — Sughrue Mion, PLLC

(57) ABSTRACT

In a method of operating a memory system, first security data and a first timestamp for preventing a replay attack are written by a host device to a first memory area which is an external memory area. A second timestamp is updated by the host device based on the first timestamp. The second timestamp corresponding to the first timestamp is stored in a second memory area distinguished from the first memory area. A first notification signal representing a result of updating the second timestamp is received by the host device. A writing operation for the first security data is completed when it is determined, by the host device, based on the first notification signal that the second timestamp is successfully updated.

19 Claims, 19 Drawing Sheets

(52) U.S. Cl.
CPC .......... *G06F 3/0673* (2013.01); *G06F 21/554* (2013.01); *G06F 2221/034* (2013.01)

(56) References Cited

U.S. PATENT DOCUMENTS

| | | | | |
|---|---|---|---|---|
| 8,200,826 | B1* | 6/2012 | Fleischman | G06F 21/78 |
| | | | | 709/227 |
| 8,417,966 | B1* | 4/2013 | Mooneyham | H04L 9/3236 |
| | | | | 713/192 |
| 8,468,365 | B2 | 6/2013 | Gueron et al. | |
| 9,071,581 | B2 | 6/2015 | Overby | |
| 9,076,019 | B2 | 7/2015 | Gueron et al. | |
| 9,471,793 | B2 | 10/2016 | Gail et al. | |
| 9,489,540 | B2 | 11/2016 | Lee et al. | |
| 9,621,549 | B2 | 4/2017 | Benoit et al. | |
| 10,111,264 | B2 | 10/2018 | Oshida | |
| 10,127,405 | B2 | 11/2018 | Le Roy et al. | |
| 10,594,671 | B2* | 3/2020 | Ja | H04L 9/0833 |
| 11,128,609 | B1 | 9/2021 | Feinberg | H04L 63/0435 |
| 2006/0239218 | A1* | 10/2006 | Weis | H04J 3/0661 |
| | | | | 370/312 |
| 2008/0307507 | A1* | 12/2008 | Conley | G06F 21/725 |
| | | | | 726/4 |
| 2009/0214028 | A1* | 8/2009 | Schneider | H04L 9/3242 |
| | | | | 380/44 |
| 2009/0305673 | A1* | 12/2009 | Mardikar | H04W 4/14 |
| | | | | 455/411 |
| 2010/0138917 | A1* | 6/2010 | Xia | H04L 43/16 |
| | | | | 726/22 |
| 2011/0040976 | A1* | 2/2011 | Yairi | G06F 1/14 |
| | | | | 713/178 |
| 2011/0162051 | A1* | 6/2011 | Li | G06F 21/31 |
| | | | | 726/5 |
| 2012/0110343 | A1* | 5/2012 | Bandic | H04L 9/3297 |
| | | | | 713/189 |
| 2012/0239698 | A1* | 9/2012 | Ohtake | G06F 16/25 |
| | | | | 707/E17.032 |
| 2013/0054917 | A1* | 2/2013 | Ludwig | G06F 9/468 |
| | | | | 711/163 |
| 2013/0077641 | A1* | 3/2013 | Burger, Jr. | H04L 9/3297 |
| | | | | 370/474 |
| 2013/0254459 | A1* | 9/2013 | Laplace | G06F 21/53 |
| | | | | 711/E12.008 |
| 2013/0297948 | A1 | 11/2013 | Lee et al. | |
| 2014/0223197 | A1* | 8/2014 | Gueron | H04L 9/3242 |
| | | | | 713/193 |
| 2014/0283085 | A1* | 9/2014 | Maestas | H04L 63/1433 |
| | | | | 726/25 |
| 2016/0004437 | A1* | 1/2016 | Kim | G06F 3/0653 |
| | | | | 714/764 |
| 2016/0246534 | A1* | 8/2016 | Koob | G06F 12/08 |
| 2016/0323741 | A1* | 11/2016 | Lee | H04W 12/06 |
| 2017/0329995 | A1 | 11/2017 | Benoit et al. | |
| 2017/0338966 | A1* | 11/2017 | Li | H04L 9/3247 |
| 2018/0046805 | A1 | 2/2018 | Le Roy et al. | |
| 2018/0183588 | A1* | 6/2018 | Corcoran | H04L 9/0866 |
| 2019/0156069 | A1* | 5/2019 | Heo | G06F 12/1408 |

FOREIGN PATENT DOCUMENTS

| | | | | |
|---|---|---|---|---|
| CN | 103620617 A | * | 3/2014 | ......... G06F 12/1408 |
| CN | 103109296 B | * | 1/2016 | ......... G06F 12/1408 |
| CN | 106104558 A | * | 11/2016 | ............. G06F 21/10 |
| CN | 107515724 A | * | 12/2017 | ......... G06F 11/3034 |
| CN | 108683501 A | * | 10/2018 | ............ H04L 9/0852 |
| CN | 110383279 A | * | 10/2019 | ......... G06F 16/2379 |
| CN | 111095963 A | * | 5/2020 | ........... G01S 13/765 |
| CN | 111161448 A | * | 5/2020 | |
| DE | 102009058516 A1 | | 6/2011 | ......... G06F 21/6218 |
| DE | 102013114953 A1 | * | 7/2014 | ............. G06F 21/00 |
| JP | 2017-28654 A | | 2/2017 | |
| JP | 2022526934 A | * | 5/2022 | |
| KR | 10-2013-0126843 A | | 11/2013 | |
| TW | I556106 B | * | 11/2016 | |
| WO | WO-2005002170 A1 | * | 1/2005 | ............. H04L 45/00 |
| WO | WO-2008151294 A1 | * | 12/2008 | ............. G06F 21/10 |
| WO | WO-2012167583 A1 | * | 12/2012 | ......... G06F 11/1451 |
| WO | WO-2018032373 A1 | * | 2/2018 | ............ H04L 63/045 |
| WO | WO-2021110288 A1 | * | 6/2021 | |

* cited by examiner

METHOD OF OPERATING MEMORY SYSTEM WITH REPLAY ATTACK COUNTERMEASURE AND MEMORY SYSTEM PERFORMING THE SAME

CROSS-REFERENCE TO RELATED APPLICATION

This application claims priority under 35 USC § 119 to Korean Patent Application No. 10-2019-0054677, filed on May 10, 2019 in the Korean Intellectual Property Office (KIPO), the contents of which are herein incorporated by reference in their entirety.

BACKGROUND

1. Technical Field

Methods, systems, apparatuses and articles of manufacture consistent with the present disclosure relate generally to semiconductor integrated circuits, and more particularly to methods of operating memory systems with countermeasures against replay attacks, and memory systems performing the methods.

2. Description of the Related Art

A system-on-chip (SoC) is used, generally, to refer to a processing apparatus that integrates various functional blocks (e.g., a central processing unit (CPU), a memory, an interface unit, a digital signal processing unit an analog signal processing unit, etc.) in a single, or a few, semiconductor integrated circuits (ICs) to implement an electronic system, such as a computer system, using a limited number of ICs. The SoC has evolved into complex systems including various functions such as multimedia, graphics, an interface, a security, etc. Data processed in the SoC are provided to an external memory device, and a replay attack that probes and reuses previous communication contents may occur when the SoC and the memory device exchange security data. Therefore, a countermeasure or defense against such a replay attack has been required.

SUMMARY

It is an aspect to provide a method of operating a memory system including a countermeasure against a replay attack capable of improving security performance.

It is another aspect to provide a memory system performing the method.

According to an aspect of one or more example embodiments, there is provided a method of operating a memory system, the method comprising writing, by a host device, first security data and a first timestamp for preventing a replay attack to a first memory area which is an external memory area; updating, by the host device, a second timestamp based on the first timestamp, the second timestamp corresponding to the first timestamp and being stored in a second memory area distinguished from the first memory area; receiving, by the host device, a first notification signal representing a result of the updating; and completing a writing operation for the first security data when it is determined, by the host device, based on the first notification signal that the second timestamp is successfully updated.

According to another aspect of one or more example embodiments, there is provided a memory system including host device, a nonvolatile memory device and a secure nonvolatile memory device. The host device processes first security data and a first timestamp for preventing a replay attack. The nonvolatile memory device is controlled by the host device, is disposed outside the host device, and includes a first memory area in which the first security data and the first timestamp are written. The secure nonvolatile memory device controlled by the host device, is formed separately from the nonvolatile memory device, and includes a second memory area in which a second timestamp corresponding to the first timestamp is written. The host device writes the first security data and the first timestamp to the first memory area, and updates the second timestamp based on the first timestamp. The secure nonvolatile memory device generates a first notification signal representing a result of updating the second timestamp. The host device completes a writing operation for the first security data when it is determined based on the first notification signal that the second timestamp is successfully updated.

According to yet another aspect of one or more example embodiments, there is provided a memory system including a host device and a nonvolatile memory device. The host device processes first security data and a first timestamp for preventing a replay attack. The nonvolatile memory device is controlled by the host device, is disposed outside the host device, includes a first memory area in which the first security data and the first timestamp are written, and includes a second memory area in which a second timestamp corresponding to the first timestamp is written. The second memory area is distinguished from the first memory area. The host device writes the first security data and the first timestamp to the first memory area, and updates the second timestamp based on the first timestamp. The nonvolatile memory device generates a first notification signal representing a result of updating the second timestamp. The host device completes a writing operation for the first security data when it is determined based on the first notification signal that the second timestamp is successfully updated.

BRIEF DESCRIPTION OF THE DRAWINGS

Illustrative, non-limiting example embodiments will be more clearly understood from the following detailed description taken in conjunction with the accompanying drawings, in which.

DETAILED DESCRIPTION

Figure 1:
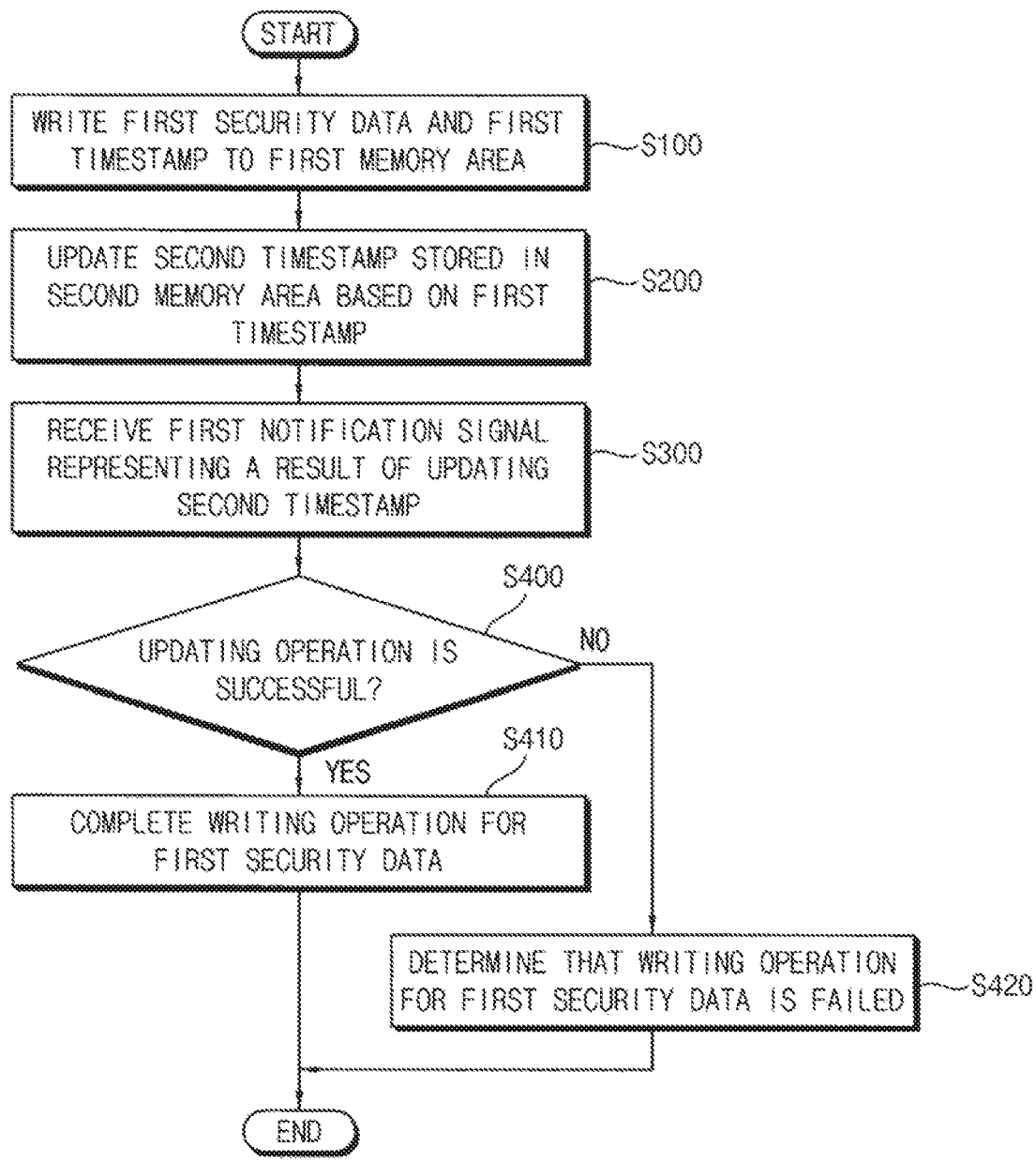
FIG. 1 is a flowchart illustrating a method of operating a memory system according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

In a memory system and a method of operating the memory system according to example embodiments, a timestamp used as a countermeasure against a replay attack may be stored in a secure storage space separated from a normal storage space, and a data protection protocol between the host device and the normal storage space may be implemented based on the timestamp in the secure storage space, thereby efficiently preventing the replay attack. In addition, at writing operation for storing security data in the normal storage space and a secure updating operation for storing the timestamp in the secure storage space may be tightly-coupled to each other, and it maybe determined that the writing operation is completed only when the secure updating operation is successfully completed, thereby ensuring the stability and reliability of operations of the memory system.

Further, when the memory system is powered on, the timestamp in the host device may be securely and safely initialized based on the timestamp stored in the secure storage space, and the subsequent operations may be performed only after the setting of the first timestamp is successfully completed, thereby more ensuring the stability and reliability of operations of the memory system.

FIG. 1 is a flowchart illustrating a method of operating a memory system according to example embodiments.

A memory system according to example embodiments includes a host device, and includes a first memory area and a second memory area that are formed separately from each other (e.g., separate, distinguished and/or distinct from each other). A configuration of the memory system will be described with reference to FIG. 2.

Referring to FIG. 1 in a method of operating the memory system according to example embodiments, when it is desired to perform a data write event for first security data, the host device writes the first security data and a first timestamp for preventing a replay attack to the first memory area (step S100). For example, the first security data may be at least one of various secure data such as a cryptographic key, sensitive data, a sensitive code, or the like. The first memory area may be disposed outside the host device, and may be a normal or general data storage space.

The replay attack represents an attack that masquerades as a legitimate user by selecting a valid message on a protocol and then copying the valid message and re-transmitting the valid message later. In other words, the replay attack represents a security hacking method that stores previous code and/or data that was communicated between the lost device and the first, memory area and then re-transmits the previous code and/or data to the host device. The first timestamp may be used as a tag for detecting the replay attack. In other words, the first timestamp may be anti-replay countermeasure data and/or information that is used to prevent the replay attack on the first security data.

The host device updates a second timestamp based on the first timestamp (step S200). The second timestamp is stored in the second memory area and corresponds to the first timestamp. As described above, the second memory area is separate, distinguished and/or distinct from the first memory area. Unlike the first memory area, the second memory area may be a secure data storage space. For example, the second timestamp may be updated to have a value substantially the same as that of the fast timestamp.

A first notification signal representing a result of updating the second timestamp stored in the second memory area is generated, and the host device receives the first, notification signal (step S300). For example, the first notification signal may be provided from a memory device including the second memory area, and may indicate whether an updating operation for the second timestamp is successful or failed.

The host device determines whether the updating operation is successful (step S400). For example, the host device may determine based on the first notification signal whether the updating operation for the second timestamp is successful or failed. When it is determined that the updating operation is successful (e.g., the second timestamp is successfully updated) (step S400: YES), a writing operation for the first security data is, completed (step S410). When it is determined that the updating operation is not successful (e.g., the second timestamp is not successfully updated) (step S400: NO), it may be determined that the writing operation for the first security data is failed (step S420).

In the method of operating the memory system according to example embodiments, the timestamp used as a countermeasure against the replay attack may be stored in a secure storage space (e.g., the second memory area) separated from a normal storage space (e.g., the first memory area), and a data protection protocol between the host device and the normal storage space may be implemented based on the timestamp stored in the secure storage space. In addition, a writing operation for storing security data in the normal storage space and a secure updating operation for storing the timestamp in the secure storage space may be tightly-coupled to each other (i.e., at the time of storing the security data in the normal storage space, the timestamp is securely updated in the secure storage space), and it may be determined that the writing operation is completed only when the secure updating operation is successfully completed. Accordingly, the replay attack may be efficiently prevented, and the stability and reliability of operations of the memory system may be ensured.

Figure 2:
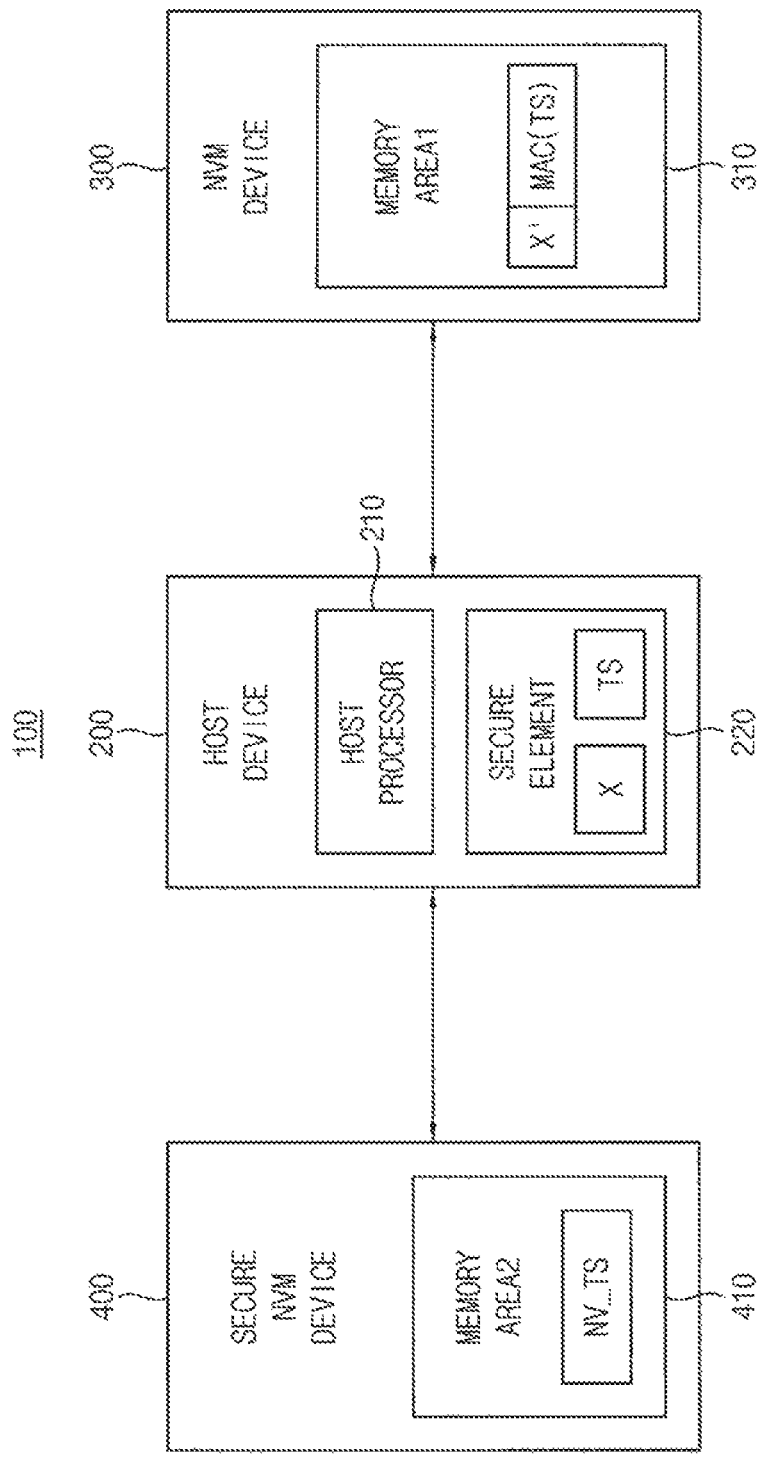
FIG. 2 is a block diagram illustrating a memory system according to example embodiments.

FIG. 2 is a block diagram illustrating a memory system according to example embodiments.

Referring to FIG. 2, a memory system 100 includes a host device 200, a nonvolatile memory (NVM) device 300 and a secure nonvolatile memory (NVM) device 400.

The host device 200 controls overall operations of the memory system 100. The host device 200 includes a host processor 210 and a secure element (SE) 220. The host device 200 may further include a host memory (not shown).

The host processor 210 controls an operation of the host device 200. For example, the host processor 210 may execute an operating system (OS) to drive the memory system 100, and may execute various applications such as providing an internet browser, executing a game, displaying a video file, controlling a camera module, etc. The operating system executed by the host processor 210 may include a file system for file management and a device driver for controlling peripheral devices including the nonvolatile memory device 300 and the secure nonvolatile memory device 400 at the operating system level.

In some example embodiments, the host processor 210 may be a central processing unit (CPU), a microprocessor, an application processor (AP), etc. In some example embodiments, the host processor 210 may include a single processor core. In some embodiments, the host processor 210 may include a plurality of processor cores.

The secure element 220 is different from the host processor 210 and is formed separately from the host processor 210 (e.g., separate, distinguished and/or distinct from the host processor 210). The secure element 220 controls an operation, of the host device 200 in a secure mode independently of the host processor 210. In other words, the secure element 220 may be used to implement an independent secure execution environment. For example, the secure element 220 may be resistant against tampering attacks, such as a replay attack, micro-probing, a software attack, eavesdropping, a fault generation attack, etc. The secure element 220 may be referred to as a security hardware, a security component or a security module.

The secure element 220 processes and/or stores first security data X and a first timestamp TS corresponding to the first security data X. In other words, the method of operating the memory system according to example embodiments may be performed and/or executed by the secure element 220 included in the host device 200. Although not illustrated in FIG. 2, the secure element 220 may include a secure processor that processes the first security data X and the first timestamp TS, a secure memory that stores the first security data X and the first timestamp TS, an one time programmable (OTP) memory that stores a key for encrypting the first security data X and the first timestamp TS, etc.

In some example embodiments, the secure element 220 may be an integrated secure element (iSE) and/or an embedded secure element (eSE) integrated into the host device 200. In other words, the host device 200 may be implemented in the form of a single semiconductor package including the secure element 220. In this example, the secure memory and the OTP memory included in the secure element 220 may be implemented in the form of an integrated random access memory(iRAM) and an integrated OTP (iOTP), respectively.

The host memory (not shown) may store instructions and/or data that are executed and/or processed by the host processor 210 and/or the secure element 220. For example, the host memory may stare a boot image, the file system, the device driver, and/or the applications.

In some example embodiments, the host device 200 may be implemented in the form of a system-on-chip (SoC).

The nonvolatile memory device 300 is accessed and controlled by the host device 200, and is, disposed outside the host device 200, in a case of integrating the secure element 220 in the host device 200, a nonvolatile memory for storing secure contents used by the secure element 220 should be integrated together in the host device 200. However, it is difficult to integrate the nonvolatile memory in the host device 200 due to a manufacturing process problem, and thus an external nonvolatile memory (e.g., the nonvolatile memory device 300) may be used to store the secure contents. Data stored in the external nonvolatile memory device 300 may be encrypted by the secure element 220 and may include a tag such as a message authentication code (MAC) for integrity check.

The nonvolatile memory device 300 includes a first memory area (MEMORY AREA1) 310 in which the first security data X and the first timestamp TS that are processed by the host device 200 (e.g., by the secure element 220 included in the host device 200) are written. For example, an encrypted first security data X' corresponding to the first security data X and a first message authentication code MAC(TS) including information associated with the first timestamp TS may be stored in the first memory area 310.

The host device 200 may control data write/read operations to the nonvolatile memory device 300. For example, when it is desired to write specific data into the nonvolatile memory device 300, the host device 200 may provide a write command, a write address and data to be written to the nonvolatile memory device 300. In addition, when it is desired to read specific data from the nonvolatile memory device 300, the host device 200 may provide a read command and a read address to the nonvolatile memory device 300 and may receive data retrieved from the nonvolatile memory device 300.

The nonvolatile memory device 300 may be accessed by both the host processor 210 and the secure element 220. In this case, the first memory area 310 may be accessed only by the secure element 220. Although not illustrated FIG. 2, the nonvolatile memory device 300 may further include a memory area that may be accessed only by host processor 210 and/or a memory area that may be accessed by both the host processor 210 and the secure element 220.

In some example embodiments, the nonvolatile memory device 300 may be implemented in the form of a normal or general data storage space. For example, the nonvolatile memory device 300 may include a flash memory (e.g., a NAND flash memory). For another example, the nonvolatile memory device 300 may include one of a phase change random access memory (PRAM), a resistance random access memory (RRAM), a nano floating gate memory (NFGM), a polymer random access memory (PoRAM), a magnetic random access memory (MRAM), as ferroelectric random access memory (FRAM), or the like.

In some example embodiments, as will be described with reference to FIG. 18, the nonvolatile memory device 300 may include one nonvolatile memory in other example embodiments, as will be described with reference to FIG. 19, the nonvolatile memory device 300 may be implemented in the form of a storage device including a plurality of nonvolatile memories.

The secure nonvolatile memory device 400 is accessed and controlled by the host device 200, and is formed separately from the nonvolatile memory device 300 (e.g., separate, distinguished and/or distinct from the nonvolatile memory device 300). In the example of FIG. 2, the secure nonvolatile memory device 400 may be disposed outside the host device 200. In other words, the host device 200 and the secure nonvolatile memory device 400 may be formed in or configured as separated semiconductor packages.

The secure nonvolatile memory device 400 includes a second memory area 410 in which a second timestamp NV_TS corresponding to the first timestamp TS is stored. For example, the first timestamp TS and the second timestamp NV_TS may have substantially the same value.

The host device 200 may control data write/read operations to the secure nonvolatile memory device 400. Unlike the nonvolatile memory device 300, the secure nonvolatile memory device 400 may be accessed only by the secure element 220.

In some example embodiments, unlike the nonvolatile memory device 300, the secure nonvolatile memory device 400 may be implemented in the form of a secure data storage space.

The memory system 100 may further include a first interface disposed or formed between the host device 200 and the nonvolatile memory device 300, and a second interface disposed or formed between the host device 200 and the secure nonvolatile memory device 400. In FIG. 2, a bi-directional arrow illustrated between the host device 200 and the nonvolatile memory device 300 may represent the first interface, and another bi-directional arrow illustrated between the host device 200 and the secure nonvolatile memory device 400 may represent the second interface.

Each of the first and second interfaces may represent a bidirectional digital interface that may transmit a digital stream, e.g., a sequence of bits. For example, a single wire or multiple wires may be implemented as an electrical transmission line, e.g., a microstrip manufactured using printed circuit board (PCB) technology, but inventive concepts are not limited thereto.

In some example embodiments, the first interface and the second interface may conform to different protocols and may exchange signals based on the different protocols. For example, the first interface may include a normal or general communication interface (e.g., a block accessible interface) such as a universal flash storage (UFS), an embedded multi-media card (eMMC), a serial advanced technology attachment (SATA) bus, a small computer system interface (SCSI) bus, a nonvolatile memory express (NVMe) bus, a serial attached SCSI (SAS) bus, or the like. The second interface may be different from the first interface and may include a dedicated security interface (or a dedicated security protocol) for secure communication. In other words, the secure element 220 and the secure nonvolatile memory device 400 may communicate with each other using a secure protocol and a secure channel.

In some example embodiments, the memory system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an Internet of everything (IoE) device, an e-book reader, a virtual reality (VR) device, an augmented reality (AR) device, a robotic device, etc. In other example embodiments, the memory system 100 may be an computing system, such as a personal computer (PC), a server computer, a workstation, a digital television, a set-top box, a navigation system, etc.

Figure 3:
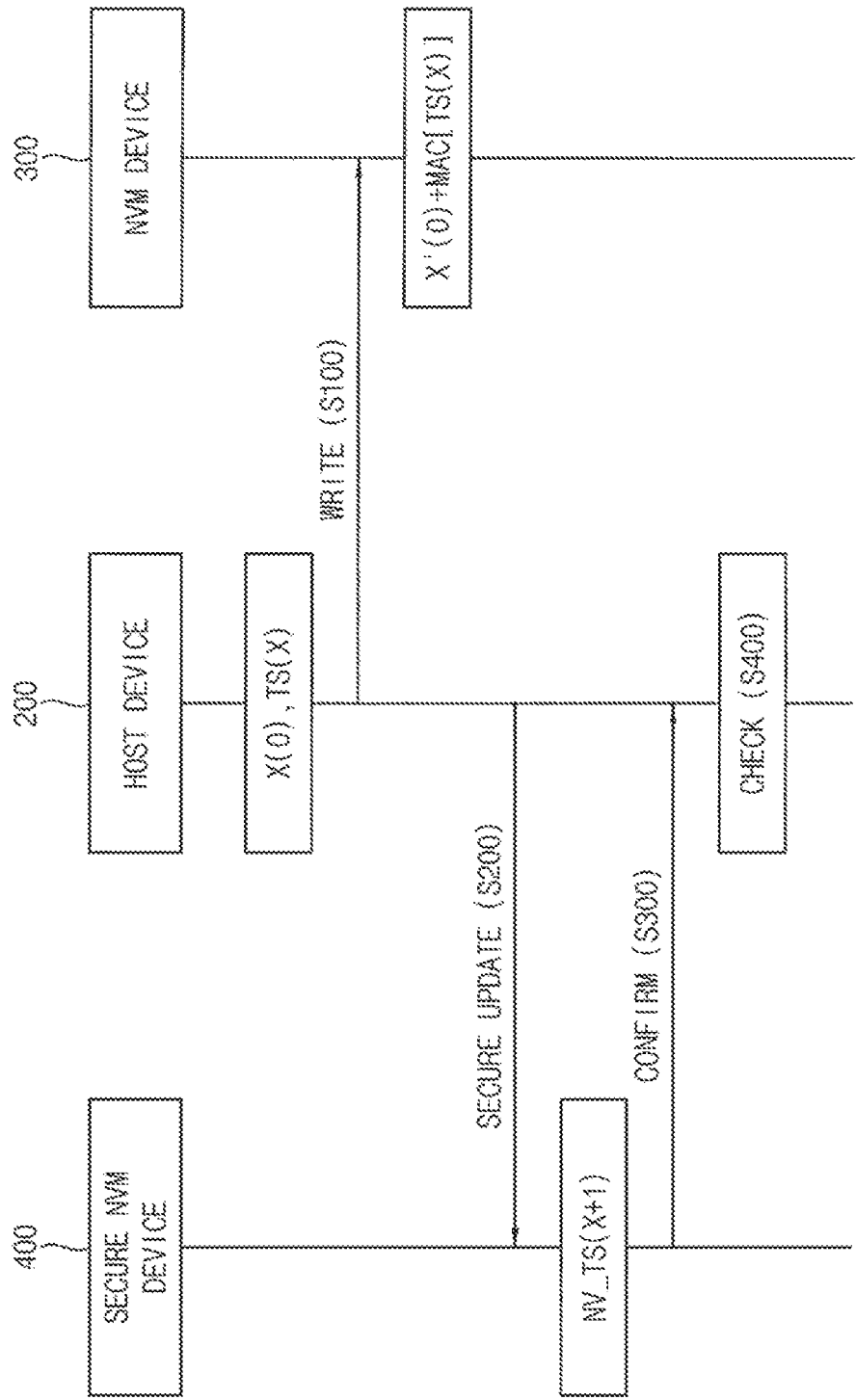
FIG. 3 is a diagram illustrating an example in which the method of FIG. 1 is performed by the memory system of FIG. 2, according to example embodiments

FIG. 3 is a diagram illustrating an example in which the method of FIG. 1 is performed by the memory system of FIG. 2, according to example embodiments.

Referring to FIGS. 1, 2 and 3, the host device 200 (e.g., the secure element 220 included in the host device 200) writes first security data X(0) and a first timestamp TS(X) corresponding to the first security data X(0) to the nonvolatile memory device 300 (e.g., the first memory area 310 included in the nonvolatile memory device 300) (step S100). An encrypted first security data X'(0) corresponding to the first security data X(0) and a first message authentication code MAC[TS(X)] including information associated with the first timestamp TS(X) may be stored in the nonvolatile memory device 300.

The host device 200 updates (SECURE UPDATE) a second timestamp NV_TS(X+1) that is stored in the secure nonvolatile memory device 400 (e.g., the second memory area 410 included in the secure nonvolatile memory device 400) and corresponds to the first timestamp TS(X) based on the first timestamp TS(X) (step S200). For example, the second timestamp may be NV_TS(X) at an initial operation time, and then may be updated to NV_TS(X+1).

The secure nonvolatile memory device 400 generates a first notification signal (CONFIRM) representing a result of updating the second timestamp NV_TS(X+1), and the host device 200 receives the first notification signal (step S300).

The host device 200 checks or determines based on the first notification signal whether the updating operation for the second timestamp NV_TS(X+1) is successful or failed (step S400). Based on a result of such determining operation, the writing operation for the first security data X(0) is completed, or it is determined that the writing operation for the first security data X(0) is failed.

Figure 4:
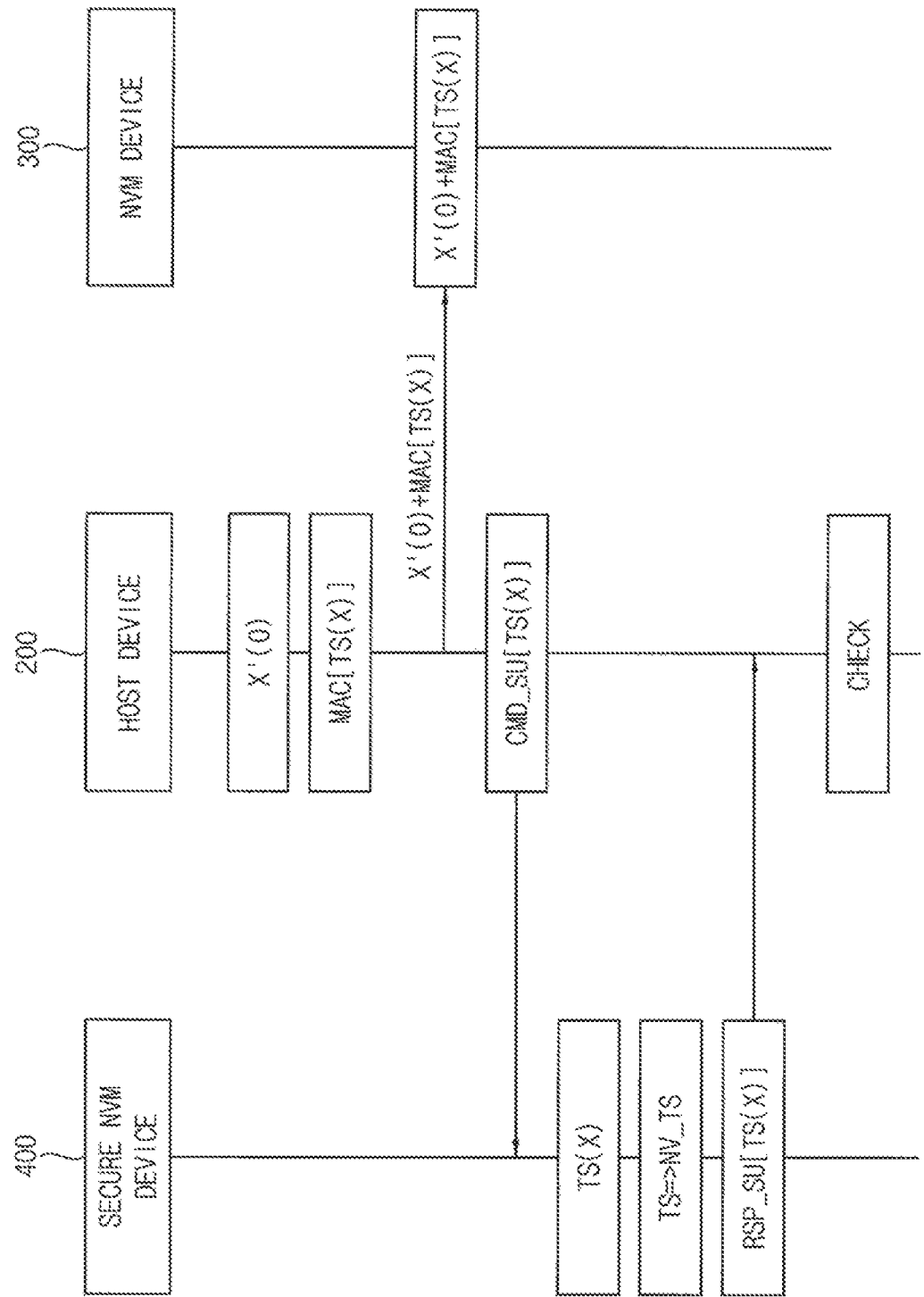
FIG. 4 is a diagram illustrating an operation of FIG. 3 in detail, according to example embodiments.
Figure 5:
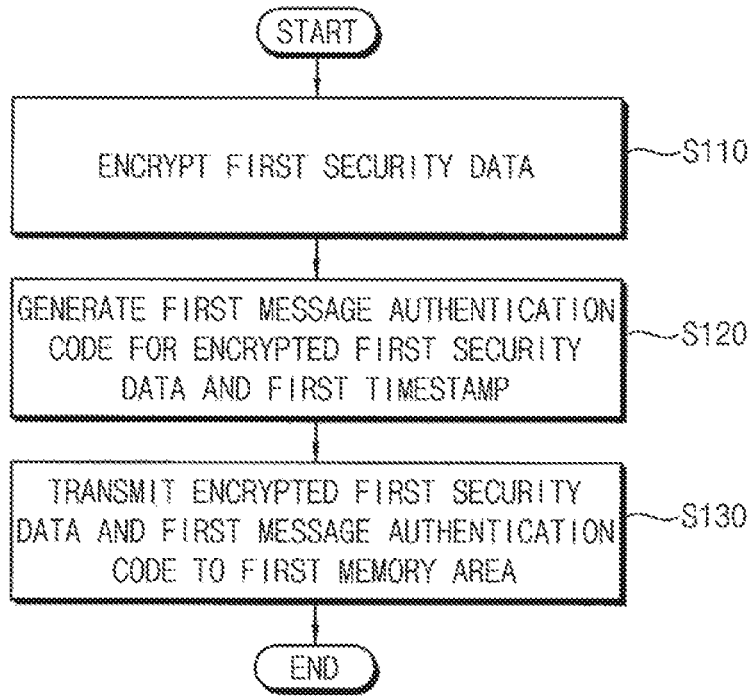
FIG. 5 is a flowchart illustrating an example of writing first security data and a first timestamp to a first memory area in FIG. 1, according to example embodiments.
Figure 6:
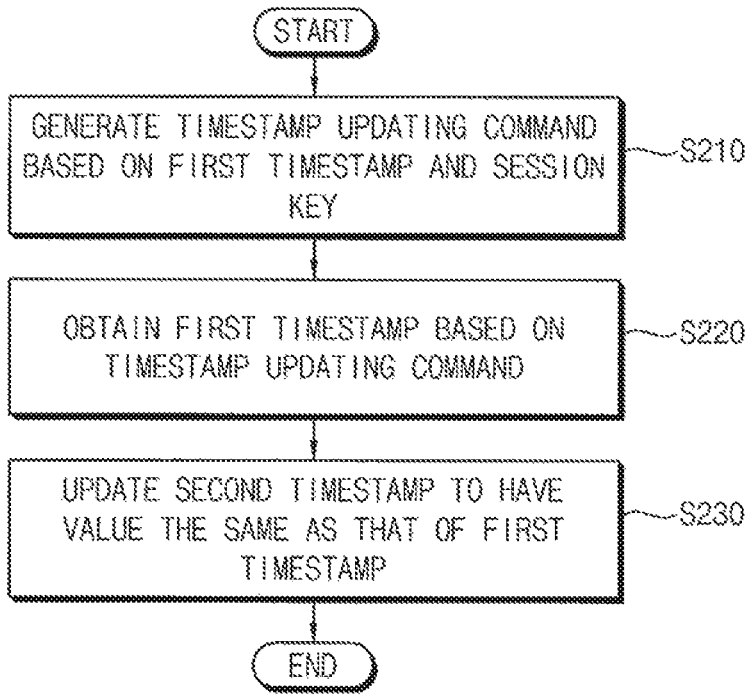
FIG. 6 is a flowchart illustrating an example of updating a second timestamp in FIG. 1, according to example embodiments.

FIG. 4 is a diagram illustrating an operation of FIG. 3 in detail, according to example embodiments. FIG. 4 illustrates steps S100 and S200 anion the operation of FIG. 3 in detail. FIG. 5 is a flowchart illustrating an example of writing first security data and a first timestamp to a first memory area in FIG. 1. FIG. 6 is a flowchart illustrating an example of updating a second timestamp in FIG. 1.

Referring to FIGS. 1, 2, 4 and 5, when writing the first security data and the first timestamp to the first memory area (step S100), the host device 200 (e.g., the secure element 220 included in the host device 200) may encrypt the first security data X(0) to generate the encrypted first security data V'(0) (step S110). For example, the encrypted first security data X'(0) may be denoted as "Enc(Data(X))", in which the description of a key for encryption is omitted.

The host device 200 may generate the first message authentication code MAC[TS(X)] for the encrypted first security data X'(0) and the first timestamp TS(X) (step S120). For example, the first message authentication code MAC[TS(X)] may be denoted as "MAC(Enc(Data(X))+TS(X))", in which the description of a key for encryption is also omitted.

The host device 200 may transmit the encrypted first security data X'(0) and the first message authentication code MAC[TS(X)] to the nonvolatile memory device 300 (e.g., the first memory area 310 included in the nonvolatile mercury device 300) (step S130). The encrypted first security data X'(0) and the first message authentication code MAC[TS(X)] may be stored in the first memory area 310.

Referring to FIGS. 1, 2, 4 and 6, when updating the second timestamp (step S200), the host device 200 (e.g., the secure element 220 included in the host device 200) may generate a timestamp updating command CMD_SU[TS(X)]0 based on the first timestamp TS(X) and a session key (step S210). For example, the timestamp updating command CMD_SU[TS(X)] may include an encrypted first timestamp denoted as "Enc(TS(X), Skey)" and a corresponding message authentication code denoted as "MAC(TS(X))", and "Skey" may represent the session key. The session key will be described with reference to FIG. 9.

The secure nonvolatile memory device 400 may update the second timestamp NV_TS(X+1) based on the timestamp updating command CMD_SU[TS(X)] such that a value of the second timestamp NV_TS(X+1) is equal to a value of the first timestamp TS(X). For example, the secure nonvolatile memory device 400 may include a processing unit capable of performing and/or executing operations described below.

The secure nonvolatile memory device 400 may obtain the first timestamp TS(X) based on the timestamp updating command CMD_SU[TS(X)] (step S220). For example, the message authentication code included in the timestamp updating command CMD_SU[TS(X)] may be checked, the encrypted first timestamp included in the timestamp updating command CMD_SU[TS(X)] may be decrypted using the session key, and thus the first timestamp TS(X) may be obtained.

The secure nonvolatile memory device 400 may update the second timestamp NV_TS(X+1) to have a value the same as that of the first timestamp TS(X) (step S230). For example, the first time stamp TS(X) obtained by the decrypting operation may be stored as the second timestamp NV_TS(X+1).

After then, the secure nonvolatile memory device 400 may generate a first notification signal RSP_SU[TS(X)]. The host device 200 may receive the first notification signal RSP_SU[TS(X)], and may determine based on the first notification signal RSP_SU[TS(X)] whether the updating operation for the second timestamp NV_TS(X+1) is successful or failed.

In the memory system and the method of operating the memory system according to example embodiments, the timestamp may be used when storing the security data, and thus the replay attack may be efficiently prevented. In addition, the timestamp may be stored in a separate secure storage space, it may be determined that the writing operation for the security data is completed only when the secure updating operation for the timestamp in the secure storage space is successfully completed, and thus the stability and reliability of operations of the memory system may be ensured.

Figure 7:
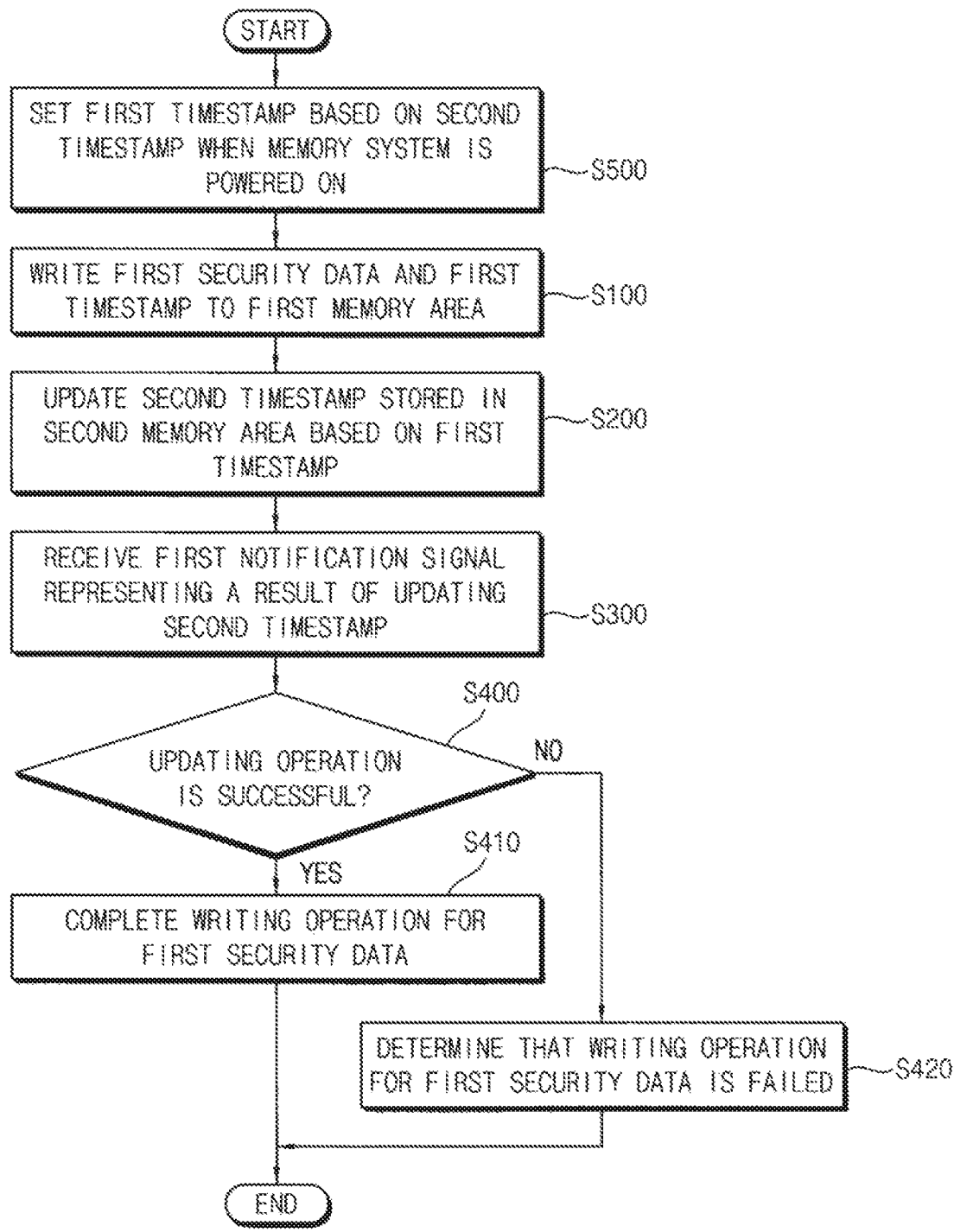
FIG. 7 is a flowchart illustrating a method of operating a memory system according to example embodiments.

FIG. 7 is a flowchart illustrating a method of operating a memory system according to example embodiments. The descriptions repeated with FIG. 1 will be omitted for conciseness.

Referring to FIG. 7, in a method of operating a memory system according to example embodiments, the host device sets (or initializes, resets) the first timestamp based on the second timestamp stored in the second memory area when the memory system is powered on (step S500). Step S500 may be performed every time or whenever the memory system is powered on.

Steps S100, S200, S300, S400, S410 and S420 in FIG. 7 that are performed after step S500 may be substantially the same as described with reference to FIG. 1.

In some example embodiments, the writing operation for the first security data may be performed only after or only when the setting of the first timestamp is successfully completed. In other words, steps S100, S200, S300, S400, S410 and S420 may be performed only after step S500 has successfully completed.

In the method of operating the memory system according to example embodiments, when the memory system is powered on, the first timestamp in the host device may be securely and safely initialized based on the second timestamp stored in a secure storage space (e.g., the second memory area). In addition, the subsequent operations may be performed only after the setting of the first timestamp is successfully completed. Accordingly, the stability and reliability of operations of the memory system may be more ensured.

Figure 8:
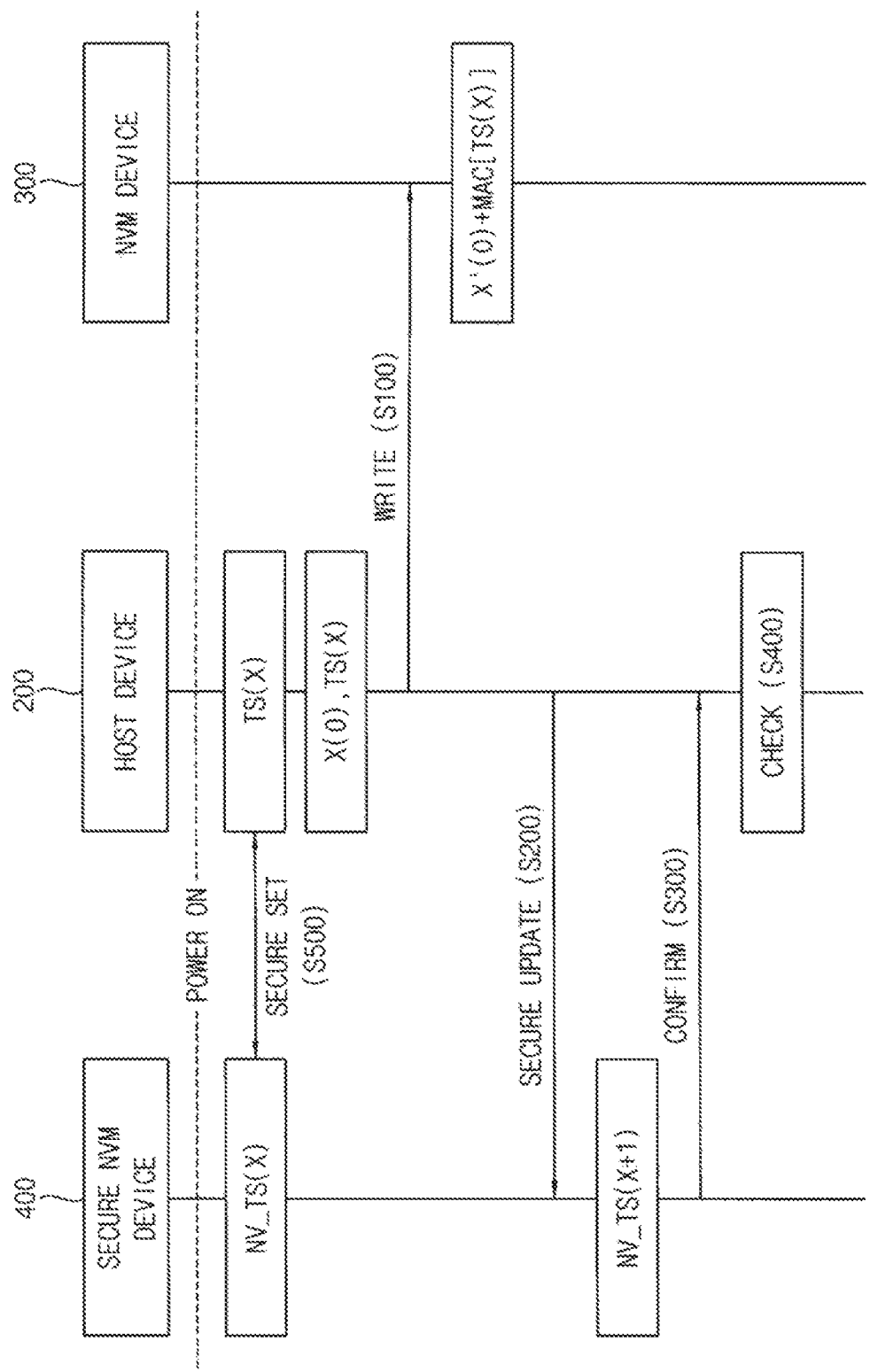
FIG. 8 is a diagram illustrating an example in which the method of FIG. 7 is performed by the memory system of FIG. 2, according to example embodiments.

FIG. 8 is a diagram illustrating an example in which the method of FIG. 7 is performed by the memory system of FIG. 2, according to example embodiments. The descriptions repeated with FIG. 3 will be omitted for conciseness.

Referring to FIGS. 2, 7 and 8, when the memory system 100 including the host device 200, the nonvolatile memory device 300 and the secure nonvolatile memory device 400 is powered on, the host device 200 (e.g., the secure element 220 included in the host device 200) sets (SECURE SET) the first timestamp TS(X) based on the second timestamp NV_TS(X) stored in the secure nonvolatile memory device 400 (e.g., the second memory area 410 included in the secure nonvolatile memory device 400) (step S500).

Steps S100, S200, S300 and S400 in FIG. 8 that are performed after step S500 maybe substantially the same as described with reference to FIG. 3.

Figure 9:
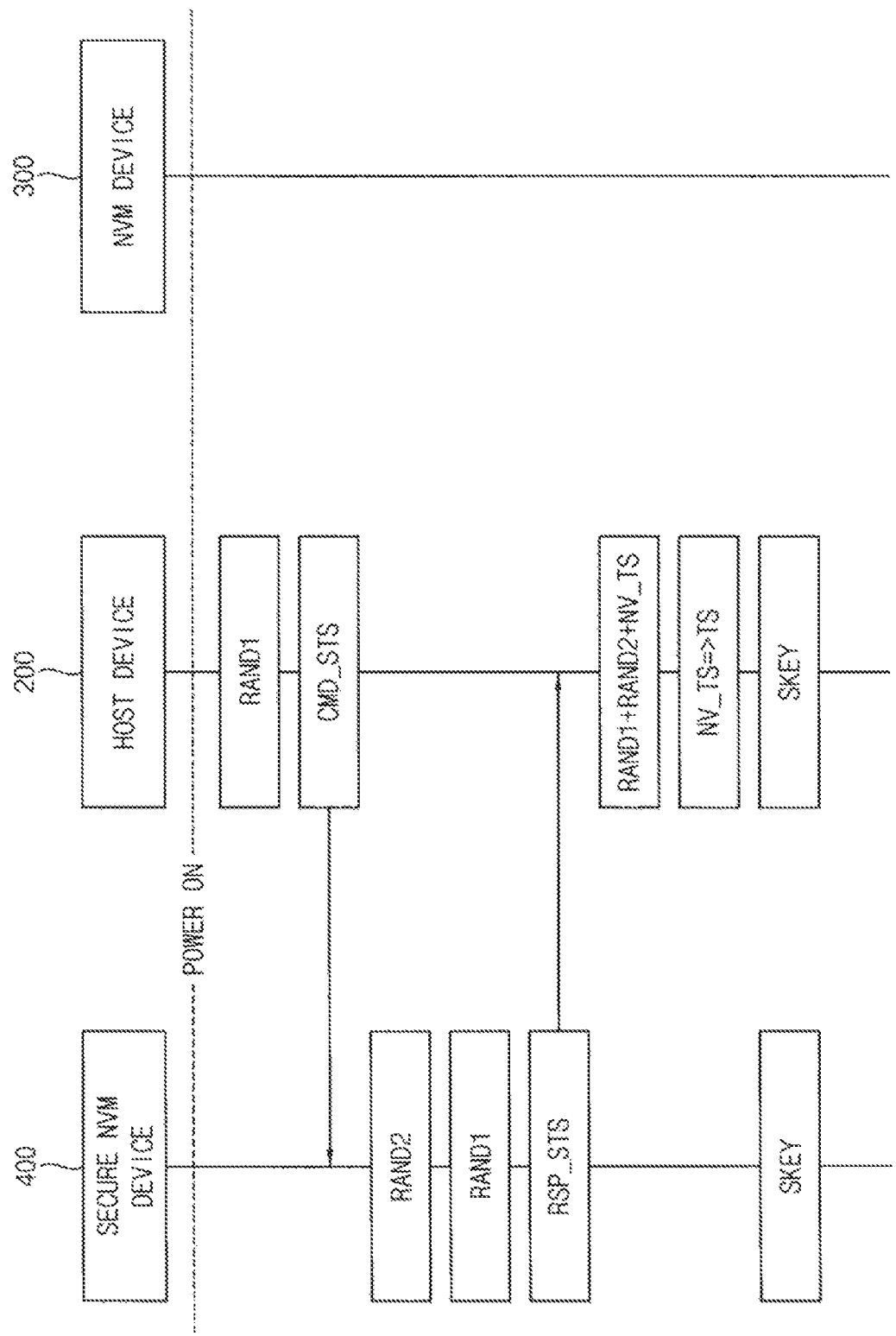
FIG. 9 is a diagram illustrating an operation of FIG. 8 in detail, according to example embodiments.
Figure 10:
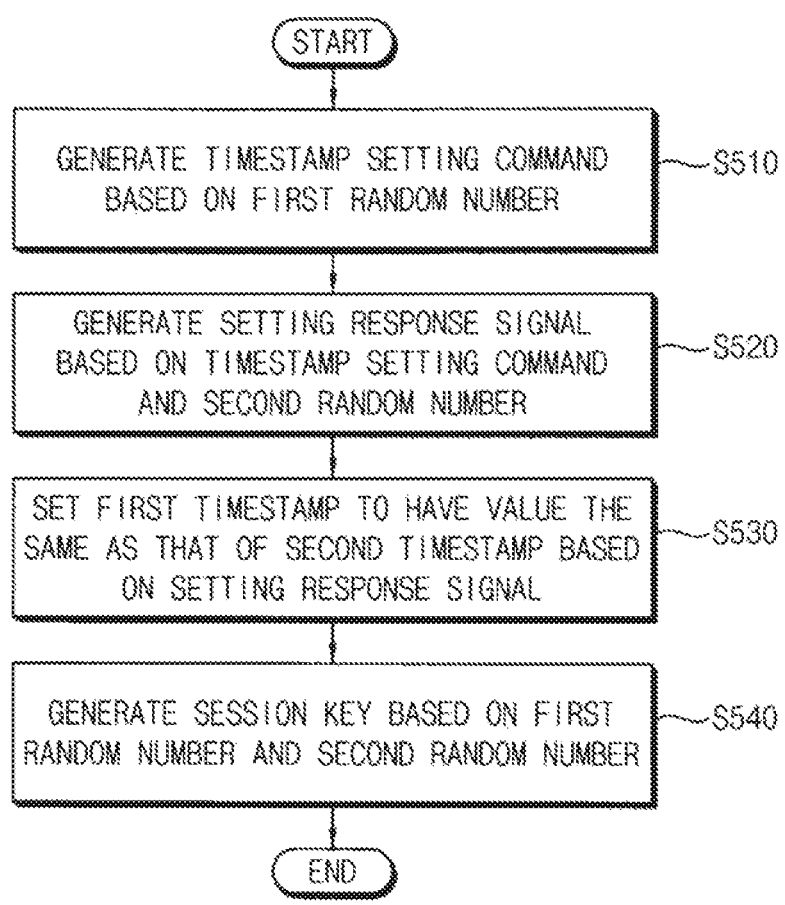
FIG. 10 is a flowchart illustrating an example of setting a first timestamp in FIG. 7, according to example embodiments.

FIG. 9 is a diagram illustrating an operation of FIG. 8 in detail, according to example embodiments. FIG. 9 illustrates step S500 among the operation of FIG. 8 in detail. FIG. 10 is a flowchart illustrating an example of setting a first timestamp in FIG. 7.

Referring to FIGS. 2, 7, 9 and 10, when setting the first timestamp based on the second timestamp (step S500), the host device 200 (e.g., the secure element 220 included in the host device 200) may generate a timestamp setting command CMD_STS based on a first random number RAND1 (step S510).

For example, the host device 200 may generate the first random number RAND1 may encrypt the first random number RAND1 to generate an encrypted first random number, and may generate the timestamp setting command CMD_STS based on the encrypted first random number. For example, the encrypted first random number may be denoted as "Enc(RAND1, Ekey)", and "Ekey" may represent a key for encryption. The timestamp setting command CMD_STS may include the encrypted first random number "Enc(RAND1, Ekey)" and a corresponding message authentication code denoted as "MAC(Enc(RAND1, Ekey), Mkey)", and "Mkey" may represent a key for a message authentication code.

The secure nonvolatile memory device 400 may generate a setting response signal RSP_STS based on the timestamp setting command CMD_STS and a second random number RAND2 (step S520). For example, the secure nonvolatile memory device 400 may include a processing unit capable of performing and/or executing operations described below.

The secure nonvolatile memory device 400 may generate the second random number RAND2, may check the message authentication code included in the timestamp setting command CMD_STS, may decrypt the encrypted first random number included in the timestamp setting command CMD_STS to obtain the first random number RAND1, and may generate the setting response signal RSP_STS based on the first random number RAND1, the second random number RAND2 and the second timestamp NV_TS. For example, the decrypting operation may be denoted as "Dec(RAND1, Ekey)", and the setting response signal RSP_STS may include encrypted data denoted as "Enc(RAND1+ RAND2+NV_TS, Ekey)" and a corresponding message authentication code denoted as "MAC(Enc(RAND1+ RAND2+NV_TS, Ekey), Mkey)".

The host device 200 may set the first timestamp TS(X) based on the setting response signal RSP_STS such that a value of the first timestamp TS(X) is equal to a value of the second timestamp NV_TS(X) (step S530).

For example, the host device 200 may check the message authentication code included in the setting response signal RSP_STS, may decrypt the encrypted data included in the setting response signal RSP_STS to obtain the first random number RAND1, the second random number RAND2 and the second timestamp NV_TS, and may set the first timestamp TS(X) to have a value the same as that of the second timestamp NV_TS(X). For example, the decrypting operation may be denoted as "Dec(RAND1+RAND2+NV_TS, Ekey)".

After the first timestamp TS(X) is set, the host device 200 and the secure nonvolatile memory device 400 may generate a session key SKEY based on the first random number RAND1 and the second random number RAND2 (step S540). For example, the session key SKEY may be denoted as "Skey=(RAND1+RAND2, Ekey)". The session key SKEY may be used in the secure updating operation, and may be used to generate the timestamp updating command CMD_SU[TS(X)] as described with reference to step S210 in FIG. 6.

In the memory system and the method of operating the memory system according to example embodiments, the timestamp in the host device may be securely and safely set and/or initialized based on the timestamp stored in a separate secure storage space when being powered on. In addition, the subsequent operations may be performed only after the setting of the timestamp in the host device is successfully completed, and thus the stability and reliability of operations of the memory system may be more ensured.

Figure 11:
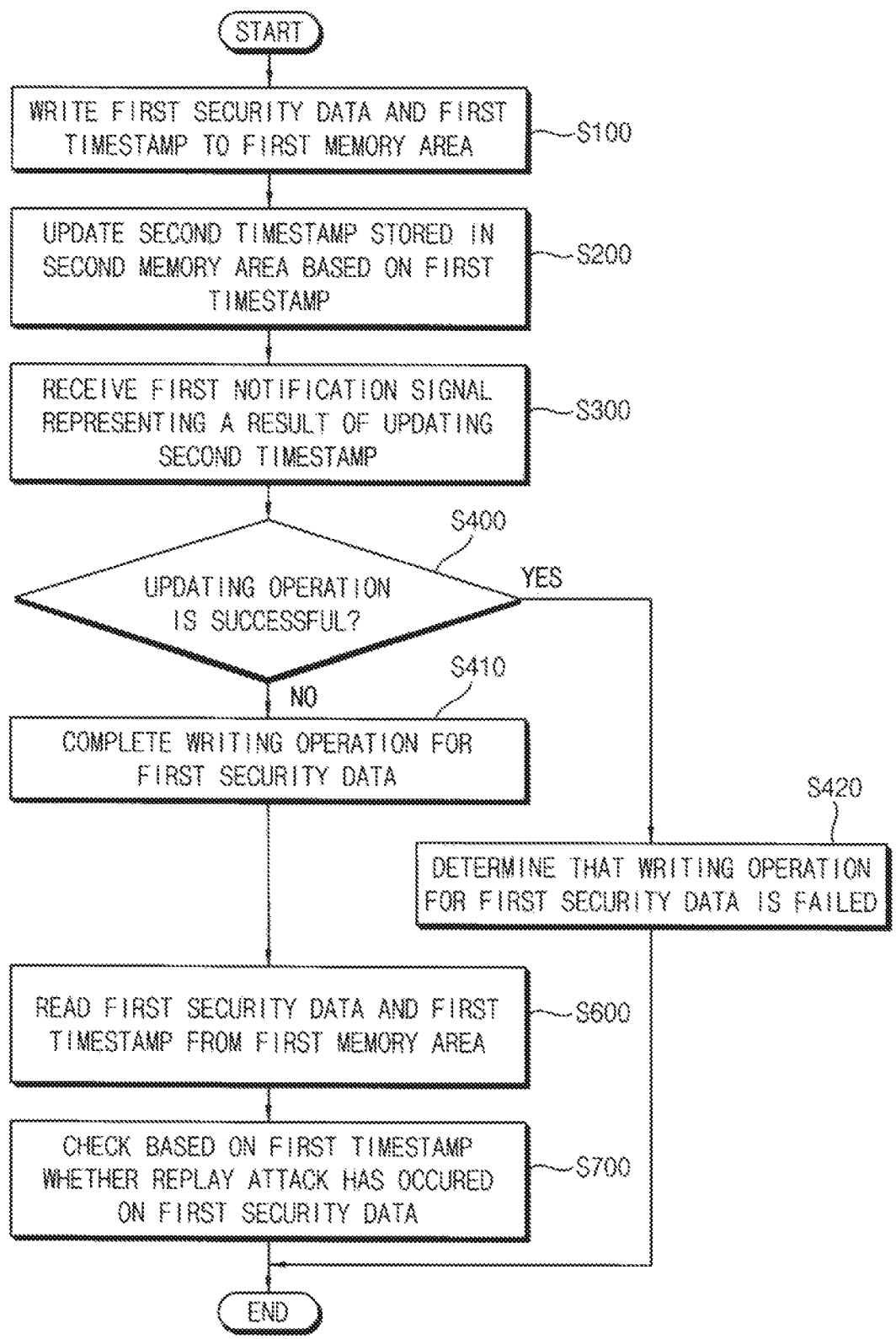
FIG. 11 is a flowchart illustrating a method of operating a memory system according to example embodiments.

FIG. 11 is a flowchart illustrating a method of operating a memory system according to example embodiments. The descriptions repeated with FIG. 1 will be omitted.

Referring to FIG. 11, in a method of operating a memory system according to example embodiments, steps S100, S200, S300, S400, S410 and S420 in FIG. 11 may be substantially the same as described with reference to FIG. 1.

When it is desired to perform a data read event for the first security data after the writing operation for the first security data is completed, the host device reads the first security data and the first timestamp from the first memory area (step S600). As described above, the encrypted first security data corresponding to the first security data and the first message authentication code corresponding to the first timestamp may be stored in the first memory area, and thus the encrypted first security data and the first message authentication code may be read from the first memory area.

The host device checks based on the first timestamp whether the replay attack has occurred on the first security data (step S700). For example, the first timestamp in the host device may be compared with the first timestamp in the first message authentication code, and thus it may be efficiently checked whether the replay attack has occurred. If a replay attack has not occurred, the host device may proceed with processing the data. If a replay attack has occurred, the host device may ignore the data or provide a notification that the replay attack has occurred.

Figure 12:
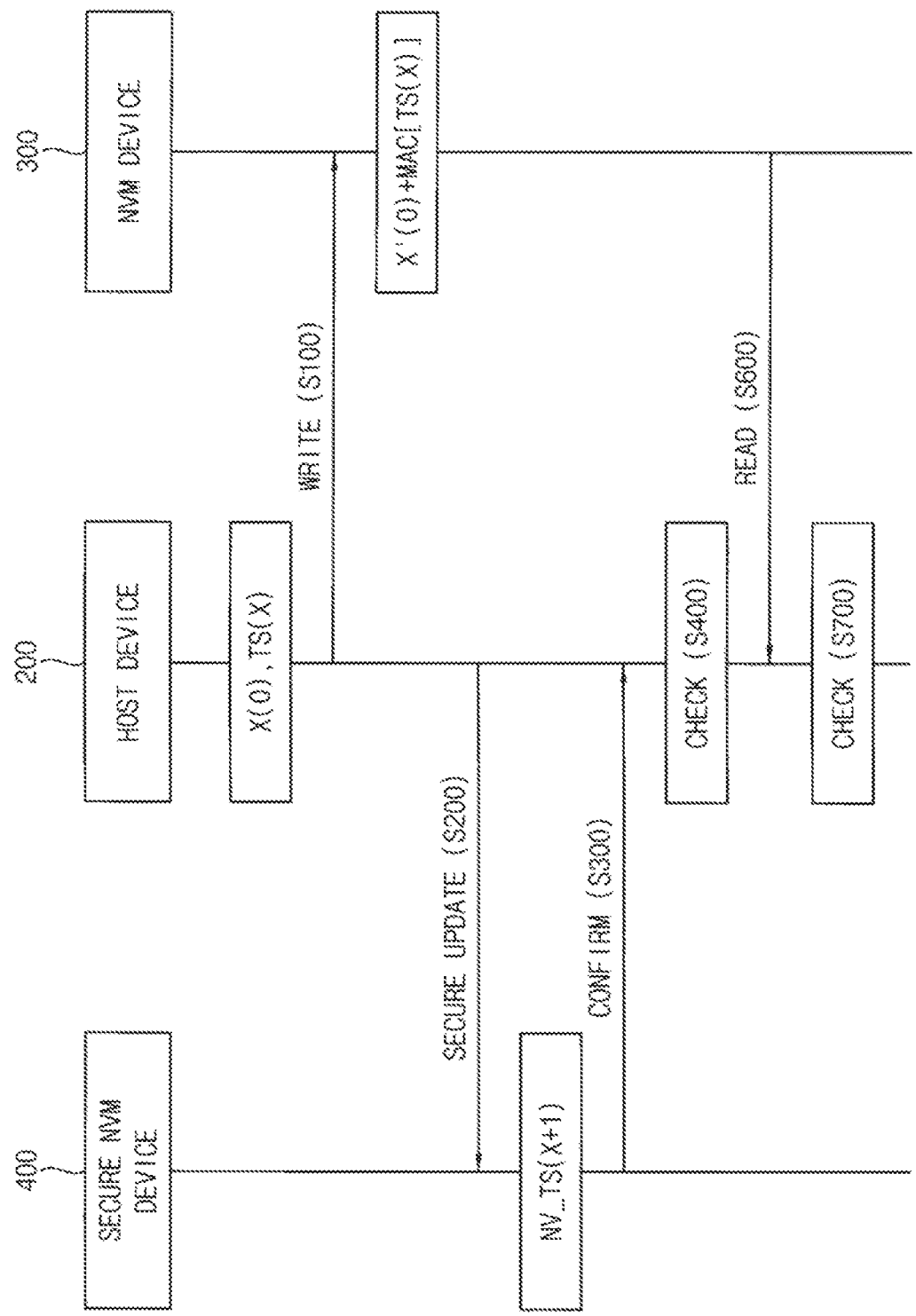
FIG. 12 is a diagram illustrating an example in which the method of FIG. 11 is performed by the memory system of FIG. 2, according to example embodiments.

FIG. 12 is a diagram illustrating an example in which the method of FIG. 11 is performed by the memory system of FIG. 2, according to example embodiments. The descriptions repeated with FIG. 3 will be omitted for conciseness.

Referring to FIGS. 2, 11 and 12, steps S100, S200, S300 and S400 in FIG. 12 may be substantially the same as described with reference to FIG. 3.

The host device 200 (e.g., the secure element 220 included in the host device 200) reads the encrypted first security data X'(0) and the first message authentication code MAC[TS(X)] from the nonvolatile memory device 300 (e.g., the first memory area 310 included in the nonvolatile memory device 300) (step S600).

The host device 200 checks, based on the first timestamp TS(X), whether the replay attack has occurred (step S700). For example, the host device 200 may decrypt the encrypted first security data X'(0) to obtain the first security data X(0), and may verify the first message authentication code MAC[TS(X)] based on the first timestamp TS(X) which is an internal timestamp.

Figure 13:
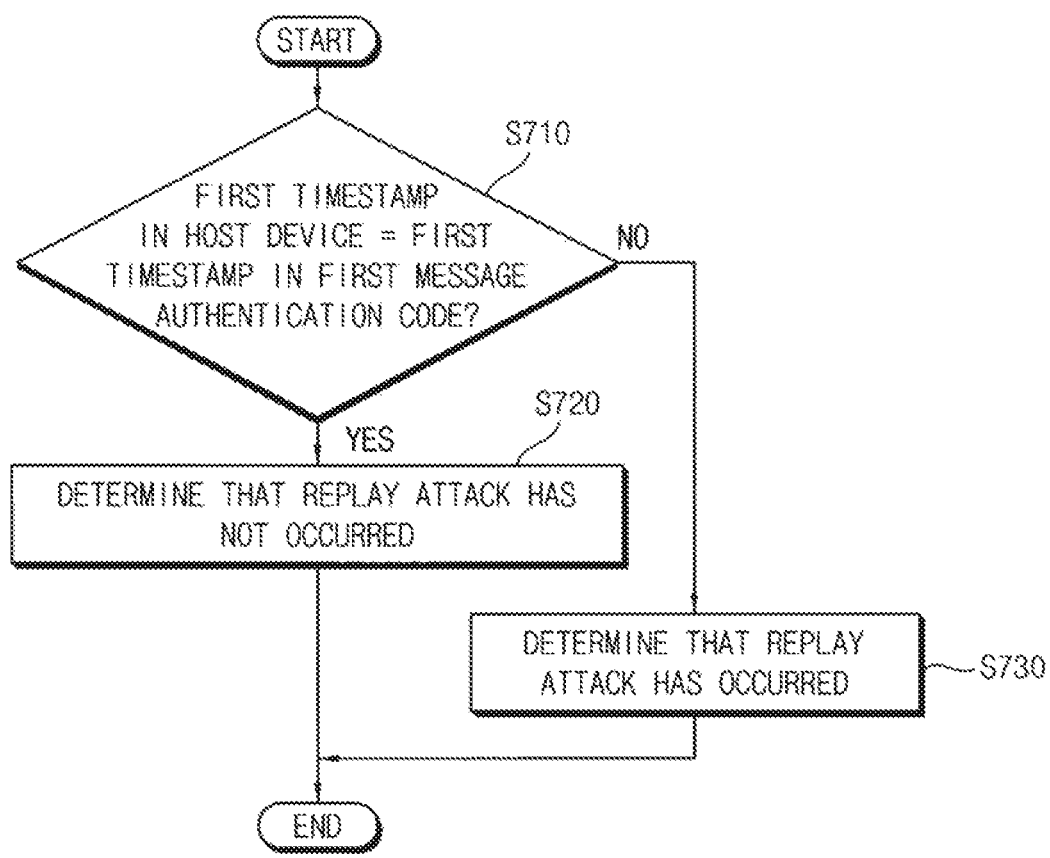
FIG. 13 is a flowchart illustrating an example of checking whether a replay attack has occurred in FIG. 11, according to example embodiments.

FIG. 13 is a flowchart illustrating an example of checking whether a replay attack has occurred in FIG. 11, according to example embodiments.

Referring to FIGS. 2, 11, 12 and 13, when checking based on the first timestamp whether the replay attack has occurred on the first security data (step S700), the first timestamp TS(X) in the host device 200 and the first timestamp TS(X) in the first message authentication code MAC[TS(X)] may be compared with each other, and it may be determined whether the first timestamp TS(X) in the host device 200 is equal to the first timestamp TS(X) in the first message authentication code MAC[TS(X)] (step S710).

When the first timestamp TS(X) in the host device 200 and the first timestamp TS(X) in the first message authentication code MAC[TS(X)] have the same value (step S710: YES), it may be determined that the replay attack has not occurred (step S720). The host device 200 may perform a desired operation, task, or the like based on the first security data X(0) obtained by the decrypting operation.

When the first timestamp TS(X) in the host device 200 and the first timestamp TS(X) in the first message authentication code MAC[TS(X)] have different values (step S710: NO), it may be determined that the replay attack has occurred (step S730). The host device 200 may take appropriate countermeasures (e.g., discard the first security data X(0) obtained by the decrypting operation, warnings, power down, etc.).

Figure 14:
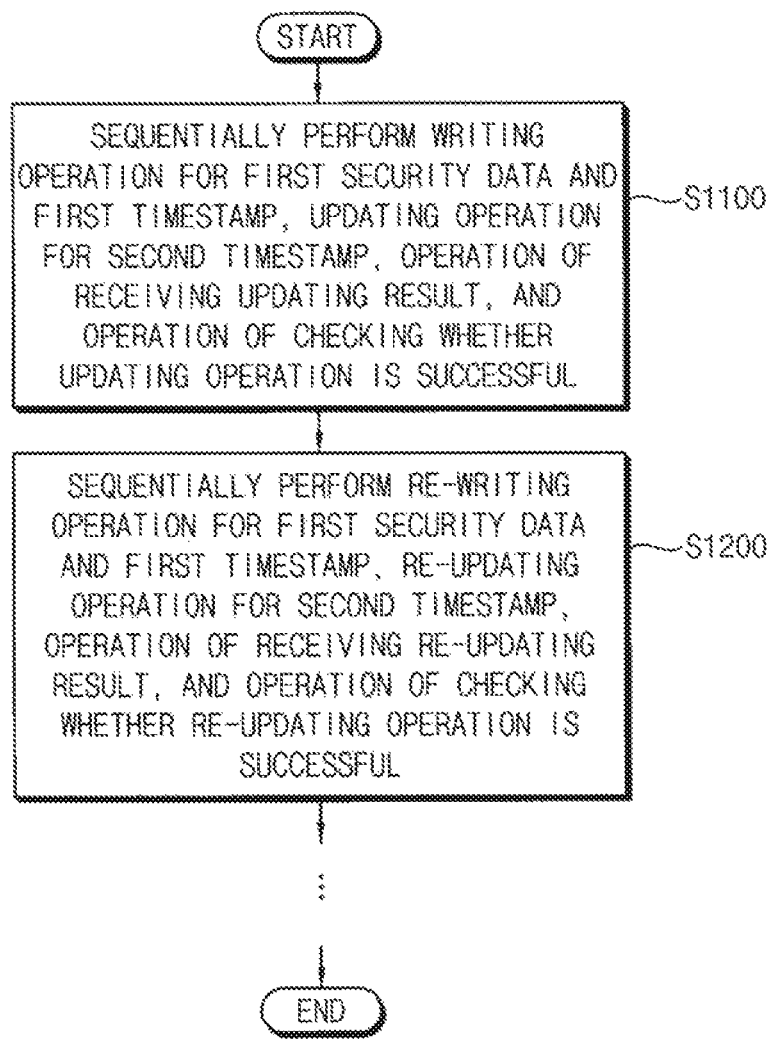
FIG. 14 is a flowchart illustrating a method of operating a memory system according to example embodiments.

FIG. 14 is a flowchart illustrating a method of operating a memory system according to example embodiments. The descriptions repeated with FIGS. 1, 7 and 11 will be omitted.

Referring to FIG. 14, in a method of operating a memory system according to example embodiments, the first timestamp is changed and updated in the second memory area every time or whenever the first security data is written to the first memory area. In other words, steps S100, S200, S300, S400, S410 and S420 described with reference to FIG. 1 may be repeatedly performed for each writing operation on the first security data.

For example, the writing operation for the first security data and the first timestamp, the updating operation for the second timestamp, the operation of receiving the updating result, and the operation of checking whether the updating operation is successful are sequentially performed (step S1100). For example, step S1100 may include steps S100, S200, S300, S400, S410 and S420 in FIG. 1.

Thereafter when the first security data and the first timestamp are changed, a re-writing operation for the first security data and the first timestamp, a re-updating operation for the second timestamp, an operation of receiving a re-updating result, and an operation of checking whether the re-updating operation, is successful are sequentially performed (step S1200).

For example, when it is desired to change (or modify, adjust) the first security data or there is a request to change the first security data, the host device may change the first security data, and the first timestamp may be changed by the host device together. Thereafter, as with steps S100, S200, S300, S400, S410 and S420 in FIG. 1, the host device may re-write the changed first security data and the changed first timestamp to the first memory area, the host device may re-update the second timestamp stored in the second memory area based on the changed first timestamp, a second notification representing a result of re-updating the second timestamp stored in the second memory area may be generated, the host device may receive the second notification signal, the re-writing operation for the changed first security data may be completed when it is determined based on the second notification signal that the second timestamp is successfully re-updated, and it may be determined that the re-writing operation for the changed first security data is failed when it is determined based on the second notification signal that the second timestamp is not successfully re-updated.

Although not illustrated in detail, when it is desired to further change the first security data after step S1200, operations substantially the same as step S1200 may be sequentially repeated, in addition, the operation of setting the first timestamp described with reference to step S500 in FIG. 7 may be further performed when a power off and power on event occurs while operating the memory system, and the operation of reading the first security data and the operation of checking whether the replay attack has occurred described with reference to steps S600 and S700 in FIG. 11 may be further performed when the data read event for the first security data occurs.

Figure 15:
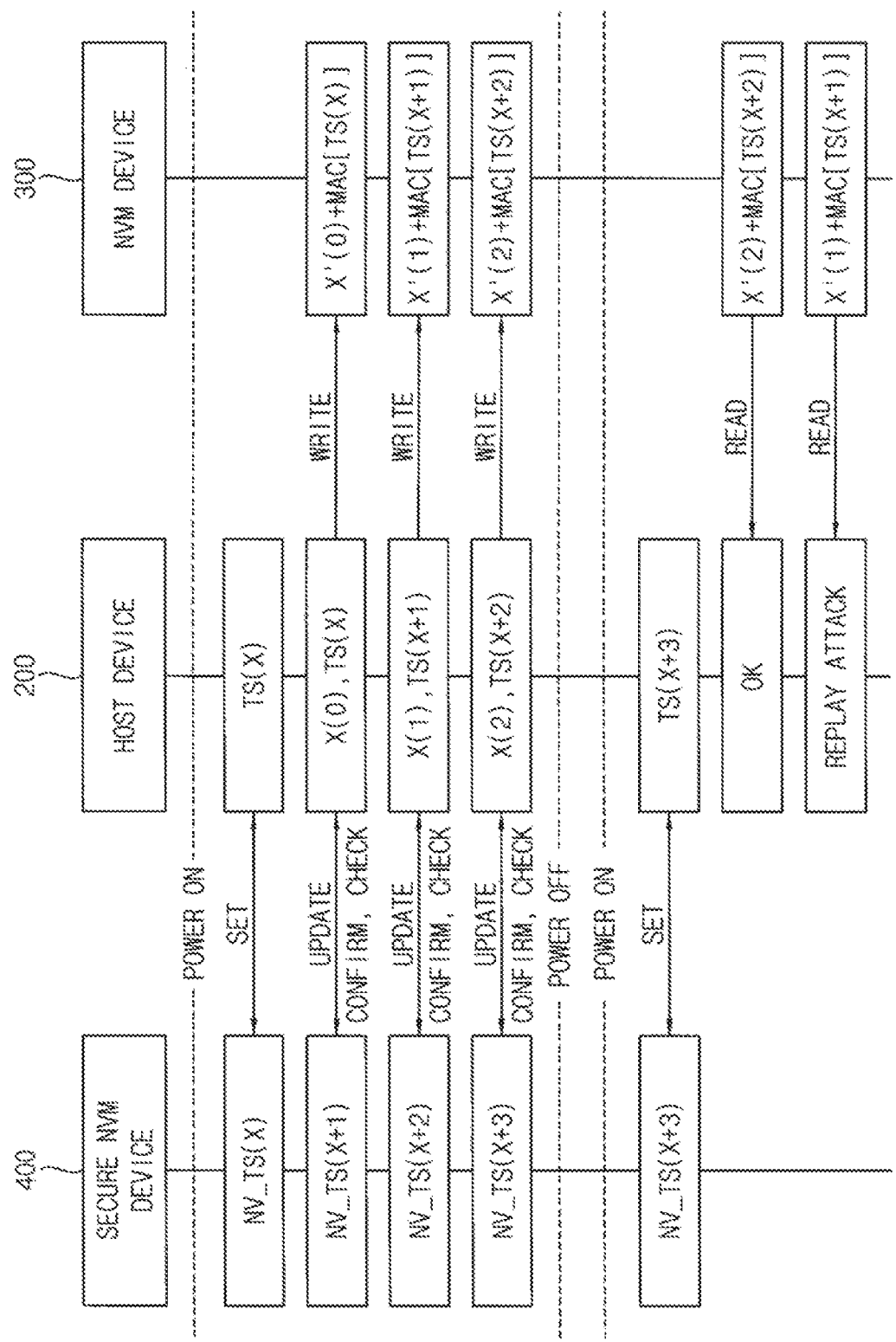
FIG. 15 is a diagram illustrating an example in which the method according to example embodiments is performed by the memory system of FIG. 2, according to example embodiments.

FIG. 15 is a diagram illustrating an example in which the method according to example embodiments is performed by the memory system of FIG. 2. The descriptions repeated with FIGS. 3, 8 and 12 will be omitted for conciseness.

Referring to FIGS. 1, 2, 7, 11 and 15, when the memory system 100 is powered on, the host device 200 may set the first timestamp TS(X) based on the second timestamp NV_TS(X) stored in the secure nonvolatile memory device 400. When it is desired to write the that security data X(0), the host, device 200 may generate the encrypted first security data X'(0) corresponding to the first security data X(0) and the first message authentication code MAC[TS(X)] corresponding to the first timestamp TS(X), and may transmit and write the encrypted first security data X'(0) and the first message authentication code MAC[TS(X)] to the nonvolatile memory device 300. The host device 200 may update the second timestamp from NV_TS(X) to NV_TS(X+1) based on the first timestamp TS (X), and may sequentially perform the operation of receiving the updating result and the operation of checking whether the updating operation is successful.

Thereafter, the host device 200 may change the first security data from X(0) to X(1), and may change the first timestamp from TS(X) to TS(X+1). The host device 200 may generate an encrypted security data X'(1) corresponding to the changed first security data X(1) and a message authentication code MAC[TS(X1)] corresponding to the changed first timestamp TS(X1), and may transmit and re-write the encrypted security data X'(1) and the message authentication code MAC[TS(X+1)] to the nonvolatile mentor device 300. The host device 200 may re-update the second timestamp from NV_TS(X+1) to NV_TS(X2) based on the changed first timestamp TS(X+1), and may sequentially perform the operation of receiving the re-updating result and the operation of checking whether the re-updating operation is successful.

Similarly, the host device 200 may change the first security data from X(1) to X(2), and may change the first timestamp from TS(X+1) to TS(X+2). Me host device 200 may generate an encrypted security data X'(2) corresponding to the changed first security data X(2) and a message authentication code MAC[TS(X+2)] corresponding to the changed first timestamp TS(X+2), and may transmit and re-write the encrypted security data X'(2) and the message authentication code MAC[TS(X+2)] to the nonvolatile memory device 300. The host device 200 may re-update the second timestamp from NV_TS(X+2) to NV_TS(X+3) based on the changed first timestamp TS(X+2), and may sequentially perform the operation of receiving the re-updating result and the operation of checking whether the re-updating operation is successful.

Thereafter, the memory system 100 may be powered off and then powered on again. When the memory system 100 is powered on, the host device 200 may set the first timestamp to TS(X+3) based on the second timestamp NV_TS(X3) lastly stored in the secure nonvolatile memory device 400.

Thereafter, the host device 200 may read the encrypted first security data corresponding to the first security data and the first message authentication code corresponding to the first timestamp from the nonvolatile, memory device 300. When X'(2) and MAC[TS(X+2)] are received as the encrypted first security data and the first message authentication code, respectively, the first timestamp TS(X+2) in the first message. authentication code and TS(X+3−1) which is the first timestamp in the host device 200 may be the same as each other, and thus it may be determined that the replay attack has not occurred. When X'(1) and MAC[TS(X+1)] are received as the encrypted first security data and the first message authentication code, respectively, the first timestamp TS(X+1) in the first message authentication code and TS(X+3−1) which is the first timestamp in the host device 200 may be different from each other, and thus it may be determined that the replay attack has occurred.

In the method of operating the memory system according to example embodiments, when storing the timestamp for the anti-replay countermeasure required by the secure element 220, the timestamp may be securely and safely stored using the external secure nonvolatile memory device 400 and a secure channel, without integrating a nonvolatile memory in the secure element 220. A timestamp variable may be set between the secure element 220 and the secure nonvolatile memory device 400, the secure element 220 may perform communication with the timestamp that updates at every writing operation, and thus the secure element 220 may efficiently detect the replay attack. In addition, the timestamp may be safely stored even in a power loss environment. For example, the timestamp may be safely stored even under any power instability condition, such as sudden power off, slowly decreasing power down, etc. Further, operations of writing reading the timestamp to/from the secure nonvolatile memory device 400 may be implemented using a secure protocol, confirmations between both the secure element 220 and the secure nonvolatile memory device 400 may be required for successful write/read operations, and thus the stability and reliability of operations of the memory system may be guaranteed.

Figure 16:
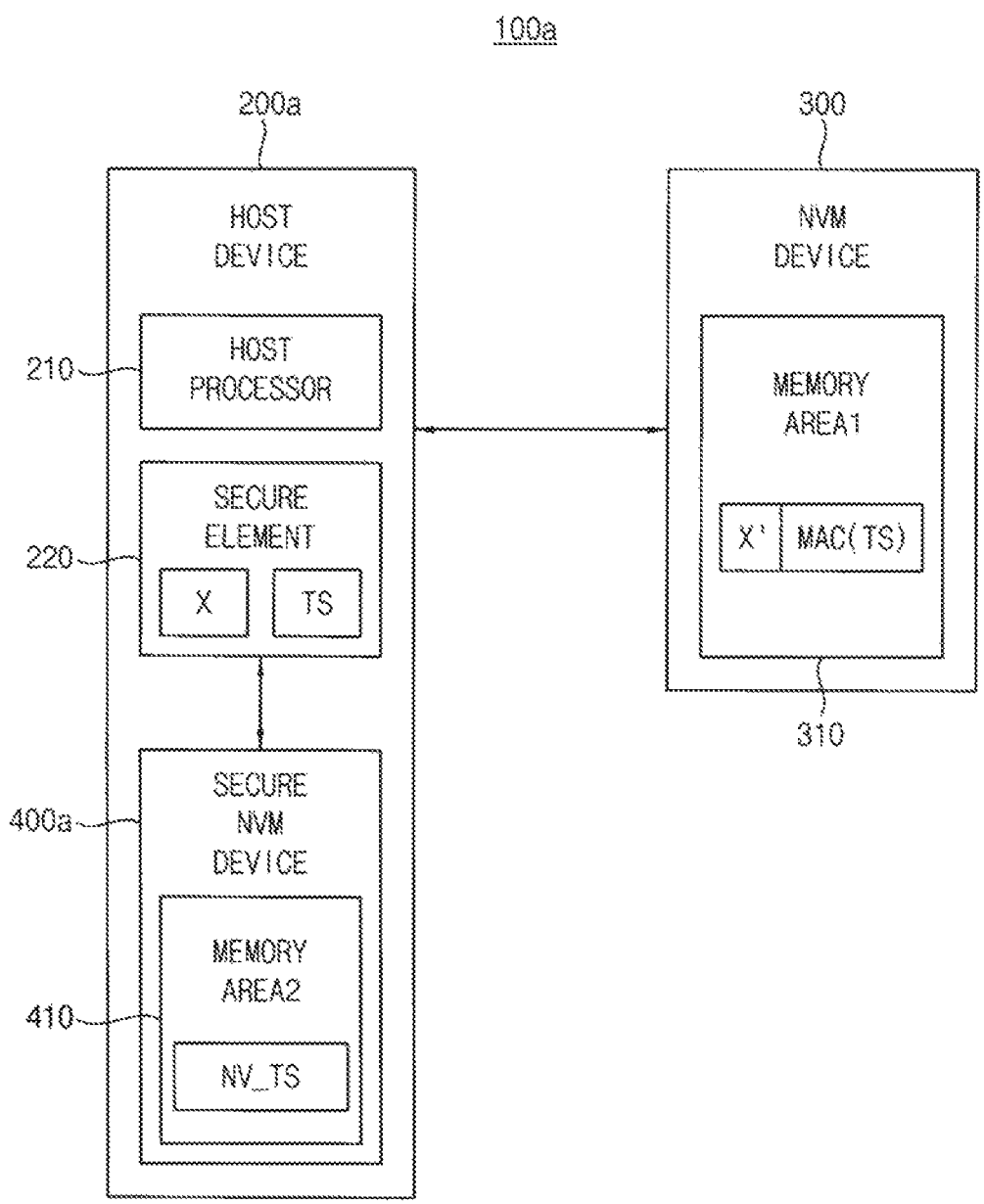
FIGS. 16 and 17 are block diagrams illustrating a memory system according to example embodiments.
Figure 17:
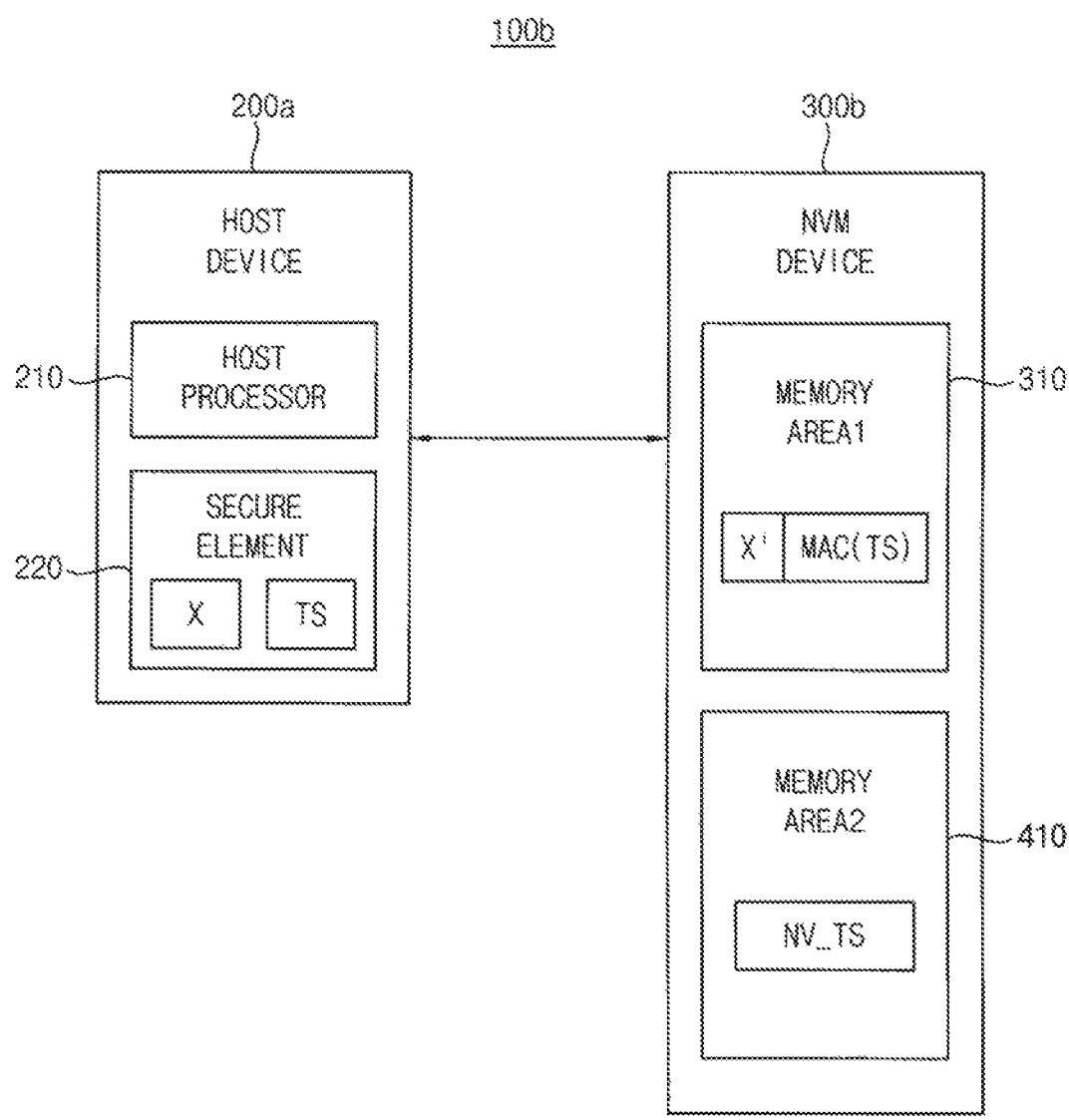

FIGS. 16 and 17 are block diagrams illustrating a memory system according to example embodiments. The descriptions repeated with FIG. 2 will be omitted for conciseness.

Referring to FIG. 16, a memory system 100a includes a host device 200a and a nonvolatile memory (NVM) device 300.

The memory system 100a of FIG. 16 may be substantially the same as the memory system 100 of FIG. 2, except that the secure nonvolatile memory (NVM) device 400a is included in the host device 200a. The memory system 100a of FIG. 16 may operate as described with reference to FIGS. 1 and 3 through 15.

In an example of FIG. 16, the secure nonvolatile memory device 400a may be disposed inside the host device 200a. In other words, the host device 200a and the secure nonvolatile memory device 400a may be formed in a single semiconductor package. However, while the host device 200a and the secure nonvolatile memory device 400a may be formed of only one semiconductor package, the secure nonvolatile memory device 400a may not be integrated in the host device 200a. In other words, the secure element 220 may be formed on the same semiconductor die with the other components (e.g., the host processor 210) of the host device 200a and integrated, in the host device 200a; however, the secure nonvolatile memory device 400a may be formed can a semiconductor die different from the semiconductor die on which the other components (e.g., the host processor 210 and the secure element 220) of the host device 200a are formed.

Referring to FIG. 17, a memory system 100b includes a host device 200 and a nonvolatile memory (NVM) device 300b).

The memory system 100b of FIG. 17 may be substantially the same as the memory system 100 of FIG. 2, except that the secure nonvolatile memory (NVM) device 400 is omitted and a second memory area (MEMORY AREA2) 410 is included in the nonvolatile memory device 300b in addition to the first memory area (MEMORY AREA1) 310. The memory system 100b of FIG. 17 may operate as described with reference to FIGS. 1 and 3 through 15.

In an example of FIG. 17, the nonvolatile memory device 300b includes the first memory area 310 in which the first security data X and the first timestamp TS are written, and the second memory area 410 in which the second timestamp NV_TS is stored. In other words, the first memory area 310 and the second memory area 410 may be include in the same nonvolatile memory device 300b.

In some example embodiments, although not illustrated in FIG. 17, the first interface through which communication is performed between the host device 200 and the first memory area 310 may be separated and distinguished from the second interface through which communication is performed between the host device 200 and the second memory area 410.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium of a computer readable storage medium. The computer readable storage medium may be any tangible medium that can contain or store a program for use by or in connection with an instruction execution system, apparatus, or device. For example, the computer readable medium may be a non-transitory computer readable medium.

Figure 18:
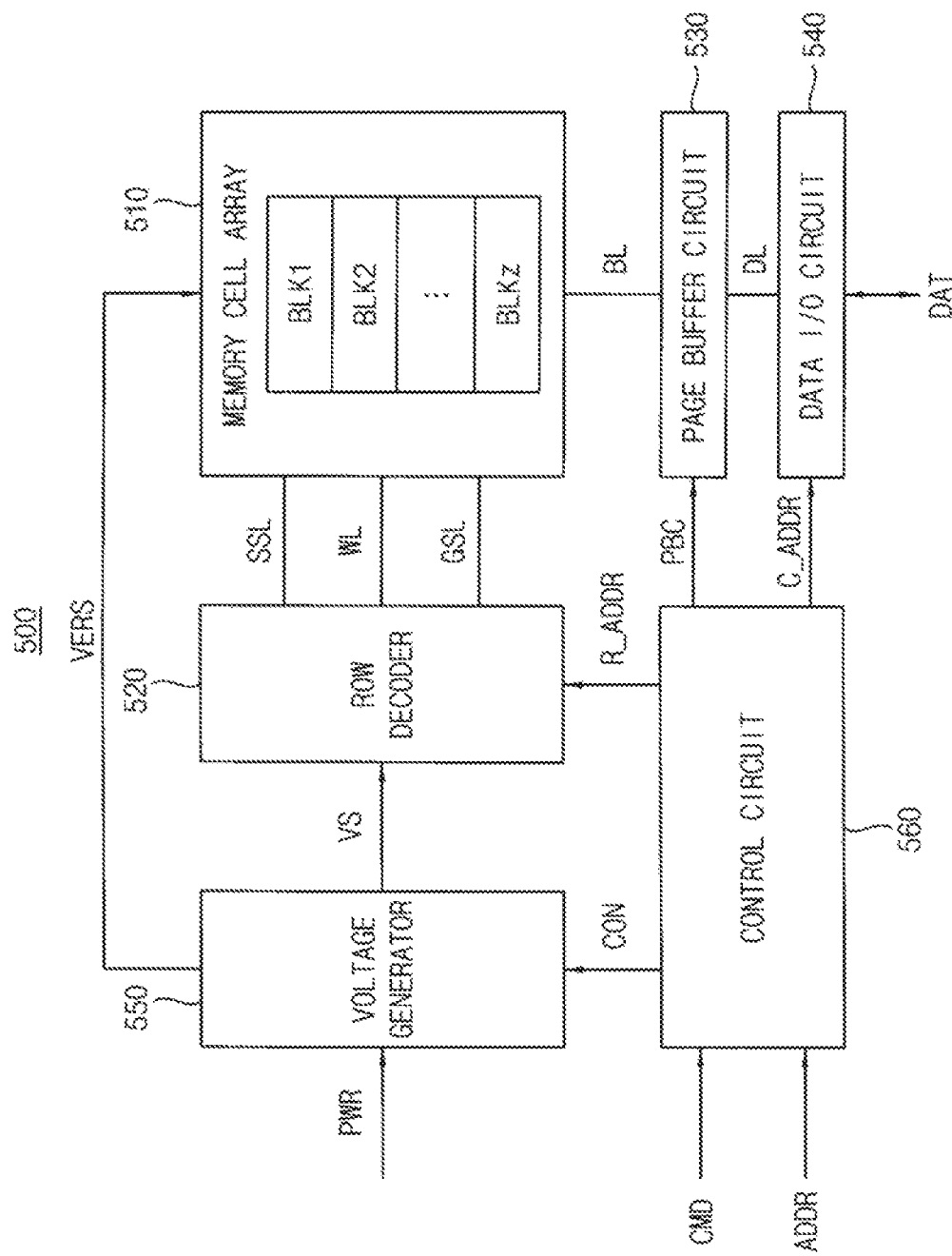
FIG. 18 is a block diagram illustrating an example of a nonvolatile memory included in a memory system according to example embodiments.

FIG. 18 is a block diagram illustrating an example of a nonvolatile memory included in a memory system according to example embodiments.

Referring to FIG. 18, a nonvolatile memory 500 includes a memory cell array 510, a row decoder 520, a page buffer circuit 530, a data input/output (I/O) circuit 540, a voltage generator 550 and a control circuit 560. The nonvolatile memory 500 may represent one nonvolatile memory included in the nonvolatile memory (NVM) device 300 of FIG. 2.

The memory cell array 510 is connected to the row decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, ..., BLKz each of which includes memory cells. In some example embodiments, the plurality of memory cells may be arranged in a two dimensional (2D) array structure or a three dimensional (3D) vertical array structure.

A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from an external device (e.g., the host device 200 in FIG. 2), and control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for control ling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the row decoder 520 and may provide the column address C_ADDR to the data I/O circuit 540.

The row decoder 520 may be connected to the memory cell array 510 via the plurality of string selection lines SSL, the plurality of wordlines WL and the plurality of around selection lines GSL.

For example, in the data erase/write/read operations, the row decoder 520 may determine at least one of the plurality of wordlines WL as a selected wordline, and may determine the rest or remainder of the plurality of wordlines WL other than the selected wordline unselected wordlines based on the row address R_ADDR.

In addition, in the data erase/write/read operations, the row decoder 520 may determine at least one of the plurality of string selection lines SSL as a selected string selection line, and may determine the rest or remainder of the plurality of string selection lines SRL other than the selected string selection line as unselected string selection lines, based on the row address R_ADDR.

Further, in the data erase/write/read operations, the row decoder 520 may determine at least one of the plurality of ground selection lines GSL as a selected ground selection line, and may determine the rest or remainder of the plurality of around selection lines GSL other than the selected ground selection line as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the row decoder 520. In addition, the voltage generator 550 may generate an erase voltage VERS that is required for the data erase operation based on, the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the row decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the row decoder 520. In addition, during the program verification operation, the voltage generator 550 may apply a program verification voltage to the selected wordline and may apply a verification pass voltage to the unselected wordlines via the row decoder 520.

In addition, during the normal read operation, the voltage generator 550 may apply a read voltage to the selected wordline and may apply a read pass voltage to the unselected wordlines via the row decoder 520. During the data recover read operation, the voltage generator 550 may apply the read voltage to a wordline adjacent to the selected wordline and may apply a recover read voltage to the selected wordline via the row decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530 or may provide the data DAT from the memory cell array 510 to the outside of the nonvolatile memory 500, based on the column address C_ADDR.

Figure 19:
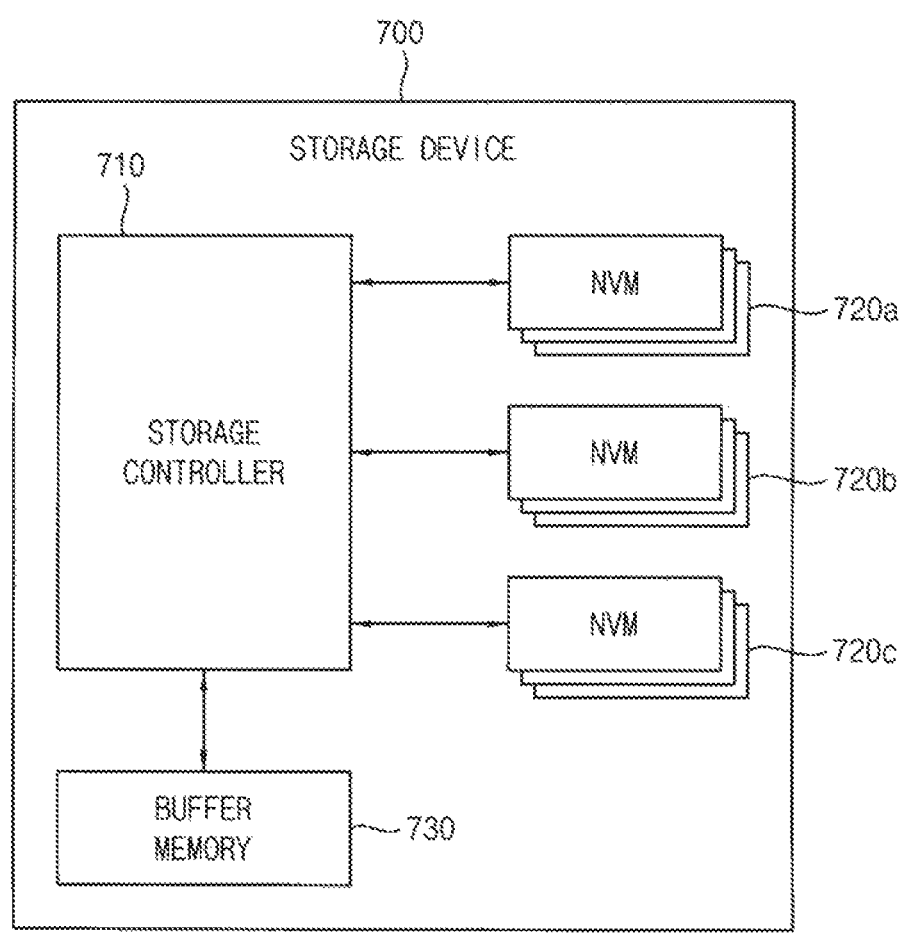
FIG. 19 is a block diagram illustrating an example of a storage device included in a memory system according to example embodiments.

FIG. 19 is a block diagram illustrating an example of a storage device included in a memory system according to example embodiments.

Referring to FIG. 19, a storage device 700 includes a storage controller 710, a plurality of nonvolatile memories (NVMs) 720a, 720b and 720c, and a buffer memory 730. The storage device 700 may include a plurality of nonvolatile memories each of which is the nonvolatile memory 500 of FIG. 18, and may be included in the nonvolatile memory (NVM) device 300 of FIG. 2.

The storage controller 710 may control an operation of the storage device 700, e.g., data write/read operations, based on a command, an address and data that are received from an external device (e.g., the host device 200 in FIG. 2).

The plurality of nonvolatile memories 720a, 720b and 720c may store a plurality of data. For example, the plurality of nonvolatile memories 720a, 720b and 720c may store meta data, secure data, user data, etc. Each of the plurality of nonvolatile memories 720a, 720b and 720c may be the nonvolatile memory 500 of FIG. 18.

The buffer memory 730 may store instructions and/or data that are executed and/or processed by the storage controller 710, and may temporarily store data stored in or to be stored into the plurality of nonvolatile memories 720a, 720b and 720c, for example, the buffer memory 730 may include at least one of various volatile memories, e.g., a dynamic random access memory (DRAM), a static random access memory (SRAM), or the like.

In some example embodiments, the storage device 700 may be an embedded multi-media card (eMMC) or a universal flash storage (UFS). In other example embodiments, the storage device 700 may be any storage device, e.g., a solid state drive (SSD), a multi media card (MMC), a secure digital (SD) card, a micro SD card, a memory stick, a chip card, a universal serial bus (USB) card, a smart card, a compact flash (CF) card, or the like.

Figure 20:
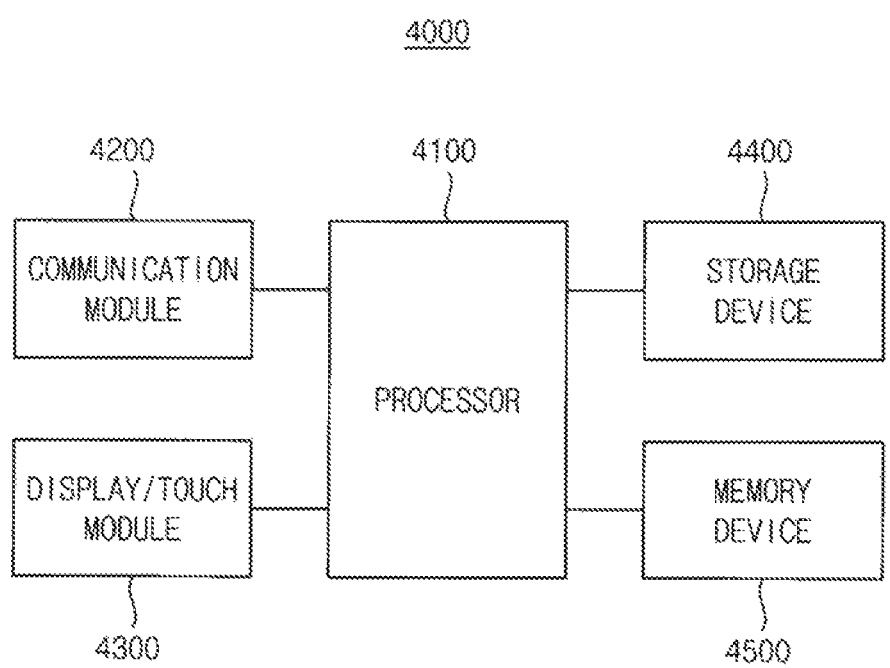
FIG. 20 is a block diagram illustrating an electronic system according to example embodiments.

FIG. 20 is a block diagram illustrating an electronic system according to example embodiments.

Referring to FIG. 20, an electronic system 4000 includes at least one processor 4100, a communication module 4200, a display/touch module 4300, a storage device 4400, and a memory device 4500. For example, the electronic system 4000 may be any mobile system or any computing system.

The processor 4100 controls operations of the electronic system 4000. The processor 4100 may execute an operating system and at least one application to provide an internet browser, games, videos, or the like. The communication module 4200 is implemented to perform wireless or wire communications with an external device. The display/touch module 4300 is implemented to display data processed by the processor 4100 and/or to receive data through a touch panel. The storage device 4400 stores user data. The memory device 4500 temporarily stares data used for processing operations of the electronic system 4000.

The processor 4100 may correspond to the host device included in the memory system according to example embodiments. The first memory area included in the memory system according to example embodiments may be included in at least one of the storage device 4400 and the memory device 4500. The second memory area included in the memory system according to example embodiments may be included in at least one of the processor 4100, the storage device 4400 and the memory device 4500.

The inventive concept may be applied to various electronic devices and systems including the memory systems. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although some example embodiments have been described, those skilled in the an will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a memory system, the method comprising:
    writing, by a host device, first security data and a first timestamp for preventing a replay attack to a first memory area which is an external memory area;
    updating, by the host device, a second timestamp based on the first timestamp, the second timestamp corresponding to the first timestamp and being stored in a second memory area distinguished from the first memory area;
    receiving, by the host device, a first notification signal representing a result of the updating; and
    completing a writing operation for the first security data when it is determined, by the host device, based on the first notification signal that the second timestamp is successfully updated;
    wherein writing the first security data and the first timestamp to the first memory area includes:
        encrypting, by the host device, the first security data;
        generating, by the host device, a first message authentication code for the encrypted first security data and the first timestamp; and
        transmitting, by the host device, the encrypted first security data and the first message authentication code to the first memory area, the encrypted first security data and the first message authentication code being stored in the first memory area.

2. The method of claim 1, further comprising:
    setting, by the host device, the first timestamp based on the second timestamp stored in the second memory area when the memory system is powered on.

3. The method of claim 2, wherein setting the first timestamp includes:
    generating, by the host device, a timestamp setting command based on a first random number;
    generating, by the second memory area, a setting response signal based on the timestamp setting command and a second random number; and
    setting, by the host device, the first timestamp based on the setting response signal such that a value of the first timestamp is equal to a value of the second timestamp.

4. The method of claim 3, wherein setting the first timestamp further includes:
    generating, by the host device and the second memory area, a session key based on the first random number and the second random number.

5. The method of claim 2, wherein the writing operation for the first security data is performed only after the setting of the first timestamp is successfully completed.

6. The method of claim 1, further comprising:
    reading, by the host device, the encrypted first security data and the first message authentication code from the first memory area; and
    checking, by the host device based on the first timestamp, whether the replay attack has occurred on the first security data.

7. The method of claim 6, wherein checking whether the replay attack has occurred includes:
    determining that the replay attack has not occurred when the first timestamp in the host device and the first timestamp in the first message authentication code have a same value; and
    determining that the replay attack has occurred when the first timestamp in the host device and the first timestamp in the first message authentication code have different values.

8. The method of claim 1, wherein updating the second timestamp includes:
    generating, by the host device, a timestamp updating command based on the first timestamp and a session key; and
    updating, by the second memory area, the second timestamp based on the timestamp updating command such that a value of the second timestamp is equal to a value of the first timestamp.

9. The method of claim 1, further comprising:
    determining that the writing operation for the first security data is failed when it is determined, by the host device, based on the first notification signal that the second timestamp is not successfully updated.

10. The method of claim 1, wherein the first timestamp is changed and updated in the second memory area whenever the first security data is written to the first memory area.

11. The method of claim 10, further comprising:
    changing, by the host device, the first security data and the first timestamp;
    re-writing, by the host device, the changed first security data and the changed first timestamp to the first memory area;
    re-updating, by the host device, the second timestamp based on the changed first timestamp;
    receiving, by the host device, a second notification signal representing a result of re-updating the second timestamp; and
    completing a re-writing operation for the changed first security data when it is determined, by the host device, based on the second notification signal that the second timestamp is successfully re-updated.

12. The method of claim 1, wherein:
    the first memory area is included in a nonvolatile memory device disposed outside the host device, and the second memory area is included in a secure nonvolatile memory device formed separately from the nonvolatile memory device.

13. The method of claim 1, wherein the first memory area and the second memory area are included in a nonvolatile memory device disposed outside the host device.

14. A memory system comprising:
a host device configured to process first security data and a first timestamp for preventing a replay attack;
a nonvolatile memory device controlled by the host device, disposed outside the host device, and including a first memory area in which the first security data and the first timestamp are written; and
a secure nonvolatile memory device controlled by the host device, formed separately from the nonvolatile memory device, and including a second memory area in which a second timestamp corresponding to the first timestamp is written,
wherein the host device is configured to write the first security data and the first timestamp to the first memory area, and to update the second timestamp based on the first timestamp,
wherein the secure nonvolatile memory device is configured to generate a first notification signal representing a result of updating the second timestamp,
wherein the host device is configured to complete a writing operation for the first security data when it is determined based on the first notification signal that the second timestamp is successfully updated, and
wherein to write the first security data and the first timestamp to the first memory area, the host device is configured to encrypt the first security data, generate a first message authentication code for the encrypted first security data and the first timestamp, and write the encrypted first security data and the first message authentication code to the first memory area.

15. The memory system of claim 14, further comprising:
a secure element integrated in the host device,
wherein the first security data and the first timestamp are processed by the secure element.

16. The memory system of claim 15, wherein the secure element and the secure nonvolatile memory device communicate with each other using a secure protocol.

17. The memory system of claim 14, wherein the host device and the secure nonvolatile memory device are formed in a single semiconductor package.

18. The memory system of claim 14, wherein the host device and the secure nonvolatile memory device are formed in separated semiconductor packages.

19. A memory system comprising:
a host device configured to process first security data and a first timestamp for preventing a replay attack; and
a nonvolatile memory device controlled by the host device, disposed outside the host device, including a first memory area in which the first security data and the first timestamp are written, and including a second memory area in which a second timestamp corresponding to the first timestamp is written, the second memory area being distinguished from the first memory area,
wherein the secure host device is configured to write the first security data and the first timestamp to the first memory area, and to update the second timestamp based on the first time stamp,
wherein the nonvolatile memory device is configured to generate a first notification signal representing a result of updating the second timestamp,
wherein the host device is configured to complete a writing operation for the first security data when it is determined based on the first notification signal that the second timestamp is successfully updated, and
wherein to write the first security data and the first timestamp to the first memory area, the host device is configured to encrypt the first security data, generate a first message authentication code for the encrypted first security data and the first timestamp, and write the encrypted first security data and the first message authentication code to the first memory area.

\* \* \* \* \*